United States Patent
Murakami et al.

(10) Patent No.: US 6,993,092 B1
(45) Date of Patent: Jan. 31, 2006

(54) TRANSMISSION APPARATUS, RECEPTION APPARATUS AND DIGITAL RADIO COMMUNICATION METHOD

(75) Inventors: Yutaka Murakami, Yokohamai (JP); Shinichiro Takabayashi, Kawasaki (JP); Masayuki Orihashi, Ichikawa (JP); Akihiko Matsuoka, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 651 days.

(21) Appl. No.: 09/627,070

(22) Filed: Jul. 27, 2000

(30) Foreign Application Priority Data

Jul. 28, 1999 (JP) ................................ 11-213289

(51) Int. Cl.
*H04L 27/36* (2006.01)
*H04L 23/02* (2006.01)

(52) U.S. Cl. ........................ 375/298; 375/261; 375/302

(58) Field of Classification Search ................ 375/261, 375/264, 271, 279, 280, 281, 284, 285, 295, 375/298, 302, 308, 296, 346, 344, 354, 362; 455/67.13, 63.1, 114.2, 102, 110; 703/30

See application file for complete search history.

(56) References Cited

U.S. PATENT DOCUMENTS

| | | | |
|---|---|---|---|
| 4,899,367 A | * | 2/1990 | Sampei ........................ 375/298 |
| 5,596,608 A | * | 1/1997 | Sassa et al. .................. 375/346 |
| 5,901,185 A | * | 5/1999 | Hassan ........................ 375/346 |
| 6,490,270 B1 | * | 12/2002 | Krishnamoorthy et al. . 375/261 |

FOREIGN PATENT DOCUMENTS

| | | |
|---|---|---|
| JP | 1-196924 | 8/1989 |
| JP | 7-250116 | 9/1995 |
| JP | 01-065645 | 3/1998 |
| JP | 10-247955 | 9/1998 |
| JP | 11-197794 | 7/1999 |

OTHER PUBLICATIONS

English Language abstract of JP-1-196924.
Shinya Otsuki et al., "Performance Analysis of Adaptive Modulation Systems Using Square-QAM", Technical Report of IEICE, RCS94-96, Sep. 1994, pp. 43-48.

(Continued)

*Primary Examiner*—Betsy L. Deppe
(74) *Attorney, Agent, or Firm*—Greenblum & Bernstein, P.L.C.

(57) ABSTRACT

Frame configuration determination section 101 judges a communication situation based on the transmission path information indicating the level of fluctuations of the transmission path due to fading and data transmission speed information indicating the transmission speed of the transmission data based on the level of the reception signal and determines the interval of inserting a known pilot symbol and the modulation system of a transmission digital signal. Quadrature baseband modulation section 102 modulates the transmission digital signal to a quadrature baseband signal according to the modulation system indicated from frame configuration determination section 101. Pilot symbol generation section 103 generates a pilot symbol known between the transmitting and receiving sides. Frame configuration section 104 inserts the known pilot symbol output from pilot symbol generation section 103 at the insertion interval instructed from frame configuration determination section 101 to configure a frame. This makes it possible to flexibly improve the data transmission efficiency and the quality of data at the same time.

14 Claims, 25 Drawing Sheets

OTHER PUBLICATIONS

English Language abstract of Shinya Otsuki et al., "Performance Analysis of Adaptive Modulation Systems Using Square-QAM", Technical Report of IEICE, RCS94-96, Sep. 1994, pp. 43-48.
English Language Abstract of 7-250116, published Sep. 26, 1995.
English Language Abstract of 1-196924, published Aug. 9, 1989.
English Language Abstract of 10-247955, published Sep. 14, 1998.
English Language Abstract of 01-065645, published Mar. 6, 1998.
English Language Abstract of 11-197794, published Jul. 13, 1999.
Murakami, et al., A Study of Inserting QPSK Symbols into 16 QAM Streams, Lecture Papers of The I Institute of Electronics, Information and Communication Engineers (1998), Japan, The Institute of Electronics, Information and Communication Engineers, Mar. 1998, Communication 1, B-5-69, p. 433, together with an English language Abstract thereof.

* cited by examiner

TRANSMISSION APPARATUS, RECEPTION APPARATUS AND DIGITAL RADIO COMMUNICATION METHOD

BACKGROUND OF THE INVENTION

1. Field of the Invention

The present invention relates to a transmission apparatus, a reception apparatus and a digital radio communication method for digital radio communications.

2. Description of the Related Art

As a conventional digital modulation system, a technology described in Unexamined Japanese Patent Publication No. HEI 1-196924 is known. This is the technology whereby the transmitting side configures a frame by inserting one known pilot symbol per N data symbols and whereby the receiving side estimates a frequency offset and amount of amplitude distortion by using the pilot symbol and removes these frequency offset and amplitude distortion for demodulation.

Here, in the case of a radio communication, fluctuations in the transmission path occur due to fading and in terrestrial mobile communication in particular, fluctuations in the transmission path are not uniform. When fluctuations in the transmission path are intense, pilot symbols must be inserted at shorter intervals to prevent deterioration of the data demodulation error rate. On the contrary, when fluctuations in the transmission path are gentle, inserting pilot symbols at longer intervals does not severely deteriorate the data demodulation error rate.

On the other hand, when the level of a reception signal on the receiving side is small, a modulation system used must be highly resistant to errors for information symbol. On the contrary, when the level of a reception signal on the receiving side is large, higher priority can be given to a modulation system of high transmission efficiency for information symbol However, in the conventional digital modulation system above, the pilot symbol insertion interval and the information symbol modulation system are fixed. Therefore, when fluctuations in the transmission path are intense or the level of the reception signal of the receiver is small, error resiliency features during data demodulation reduces and the quality of data deteriorates. On the other hand, when fluctuations in the transmission path are gentle or the level of the reception signal on the receiving side is large, the data transmission efficiency cannot be improved regardless of data quality.

SUMMARY OF THE INVENTION

It is an object of the present invention to provide a transmission apparatus, a reception apparatus and a digital radio communication method that improve data transmission efficiency and data quality.

The present invention attains the above object by changing the interval for inserting known pilot symbol, binary phase (BPSK: Binary Phase Shift Keying) modulation symbol, and quadrature phase (QPSK: Quadrature Phase Shift Keying) modulation symbol, and by changing the modulation system of information symbol according to the communication situation such as fluctuations in the transmission path and the level of a reception signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

With reference now to the attached drawings, embodiments of the present invention will be explained in detail below.

Embodiment 1

Embodiment 1 describes a digital radio communication method by which the interval for inserting known pilot symbols and the modulation system of information symbol are changed according to the communication situation.

Figure 1:
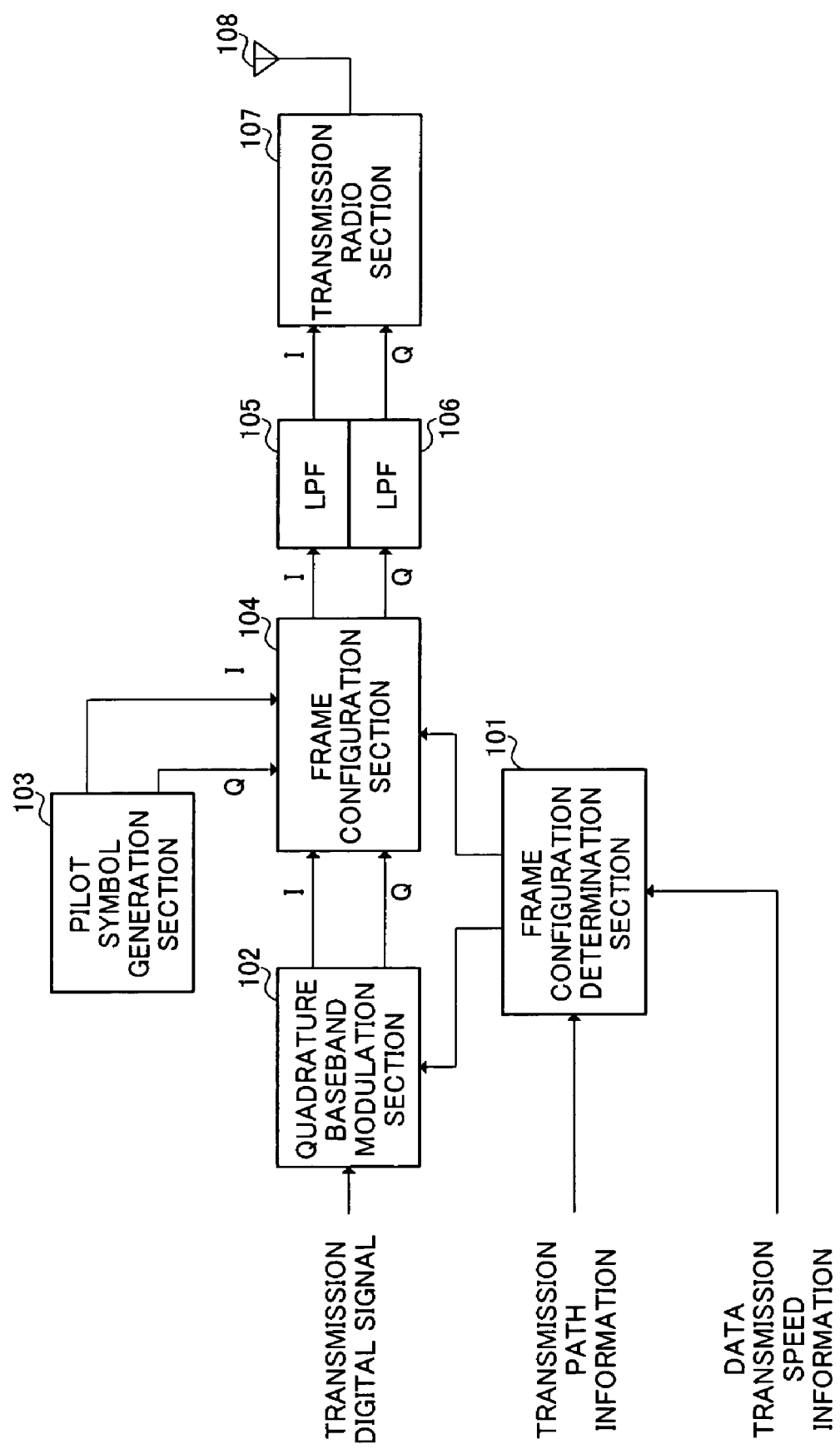
FIG. 1 is a block diagram showing a configuration of a transmission apparatus according to Embodiment 1 of the present invention.

FIG. 1 is a block diagram showing a configuration of a transmission apparatus according to this embodiment. As shown in FIG. 1, the transmission apparatus according to this embodiment mainly consists of frame configuration determination section 101, quadrature baseband modulation section 102, pilot symbol generation section 103, frame configuration section 104, and LPFs (Low Pass Filters) 105 and 106, transmission radio section 107 and transmission antenna 108.

Frame configuration determination section 101 judges the communication situation based on transmission path information that indicates the degree of fluctuations of the transmission path due to fading and based on data transmission speed information that indicates the transmission speed of transmission data based on the level of a reception signal, and decides the interval for inserting known pilot symbols and the modulation system of digital transmission signals. Then, frame configuration determination section 101 outputs a signal indicating the determined modulation system to quadrature baseband modulation section 102 and outputs a signal indicating the determined interval for inserting known pilot symbol to frame configuration section 104. By the way, details of the method of determining a frame configuration by frame configuration determination section 101 will be described later.

Here, when the same frequency band is used for the uplink and the downlink, the situation of fluctuations in the transmission path due to fading can be estimated from a transition in the result of measuring the reception level of the modulated signal transmitted from the communicating party on the unillustrated receiving side of the communication apparatus in which the transmission apparatus shown in FIG. 1 is mounted. Furthermore, the transmission apparatus shown in FIG. 1 can recognize the situation of fluctuations in the transmission path due to fading, as the reception apparatus of the communicating party of the transmission apparatus shown in FIG. 1 measures the reception level of the modulated signal transmitted from the communicating party and estimates the situation of fluctuations in the transmission path due to fading based on the transition of the measurement result.

Then, when the same frequency band is used for the uplink and the downlink, the transmission speed of the transmission data can be determined from a result of measuring the reception level of the modulated signal transmitted from the communicating party on the unillustrated receiving side, of the communication apparatus in which the transmission apparatus shown in FIG. 1 is mounted. Furthermore, the transmission apparatus shown in FIG. 1 can recognize the transmission speed of the transmission data as the reception apparatus of the communicating party of the transmission apparatus shown in FIG. 1 measures the reception level of the pilot symbol transmitted from the communicating party and determines the transmission speed of the transmission data based on the measurement result.

Quadrature baseband modulation section 102 modulates a digital transmission signal to a quadrature baseband signal with the modulation system indicated from frame configuration determination section 101 and outputs the in-phase component and the quadrature component of the quadrature baseband signal to frame configuration section 104.

Pilot symbol generation section 103 generates a known pilot symbol between the transmitting side and the receiving side and outputs the in-phase component and the quadrature component of the known pilot symbol to frame configuration section 104.

Frame configuration section 104 inserts known pilot symbols output from pilot symbol generation section 103 into the output signal of quadrature baseband modulation section 102 at the insertion interval instructed from frame configuration determination section 101 and composes a frame.

LPF 105 lets pass only the portion corresponding to a predetermined frequency bandwidth of the in-phase component output from frame configuration section 104. LPF 106 lets pass only the portion corresponding to a predetermined frequency bandwidth of the quadrature component output from frame configuration section 104.

Transmission radio section 107 transmits a radio frequency signal as the electric wave from transmission antenna 108 after performing radio processing on the output signals of LPF 105 and LPF 106.

Next, examples of the method of determining a frame configuration by frame configuration determination section 101 of the transmission apparatus shown in FIG. 1 above will be explained.

Figure 2:
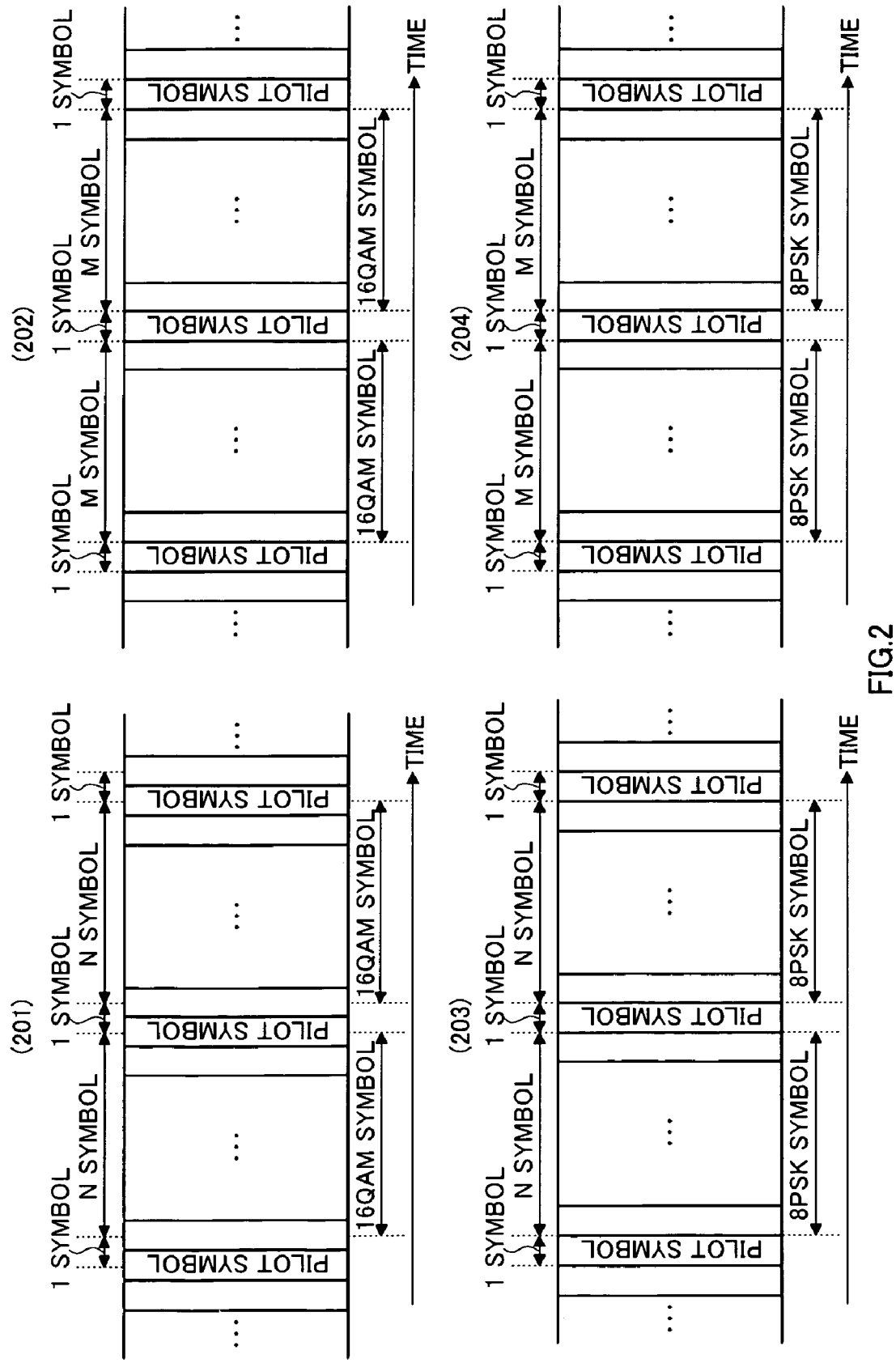
FIG. 2 illustrates examples of a frame configuration of a signal transmitted from the transmission apparatus of Embodiment 1 of the present invention.

FIG. 2 illustrates examples of a frame configuration of a signal transmitted from the transmission apparatus of this embodiment and shows a time-symbol relationship. (201) is a frame configuration where the modulation system of information symbol is 16-level quadrature amplitude modulation (16QAM: 16 Quadrature Amplitude Modulation), with a known pilot symbol provided for every N symbols. (202) is a frame configuration where the modulation system of information symbol is 16QAM, with a known pilot symbol provided for every M symbols. (203) is a frame configuration where the modulation system of information symbol is 8 phase (8PSK: 8 Phase Shift Keying) modulation, with a known pilot symbol provided for every N symbols. (204) is a frame configuration where the modulation system of information symbol is 8PSK modulation, with a known pilot symbol provided for every M symbols. Suppose N<M at this time.

Frame configuration determination section 101 selects one of (201), (202), (203) or (204) in FIG. 2 as the optimal frame configuration based on the transmission path information and the request data transmission speed information.

For example, in the case of high-speed fading, frame configuration determination section 101 sacrifices data transmission efficiency on the receiving side and selects the frame configuration of either (201) or (203) in FIG. 2 so as to insert known pilot symbols at shorter intervals to prevent deterioration of the data demodulation error rate and maintain the quality of data. On the other hand, in the case of low-speed fading, frame configuration determination section 101 selects the frame configuration of either (202) or (204) in FIG. 2 so as to insert known pilot symbols at longer intervals to improve the data transmission efficiency.

Also, when the level of the reception signal is large, frame configuration determination section 101 gives priority to data transmission efficiency on the receiving side and selects the frame configuration of either (201) or (202) in FIG. 2 adopting 16QAM as the modulation system of information symbol. On the other hand, when the level of the reception signal is small, frame configuration determination section 101 gives priority to increasing error resiliency features while sacrificing data transmission efficiency on the receiving side, and selects the frame configuration of either (203) or (204) in FIG. 2 that adopts 8PSK as the modulation system of information symbol.

Figure 3:
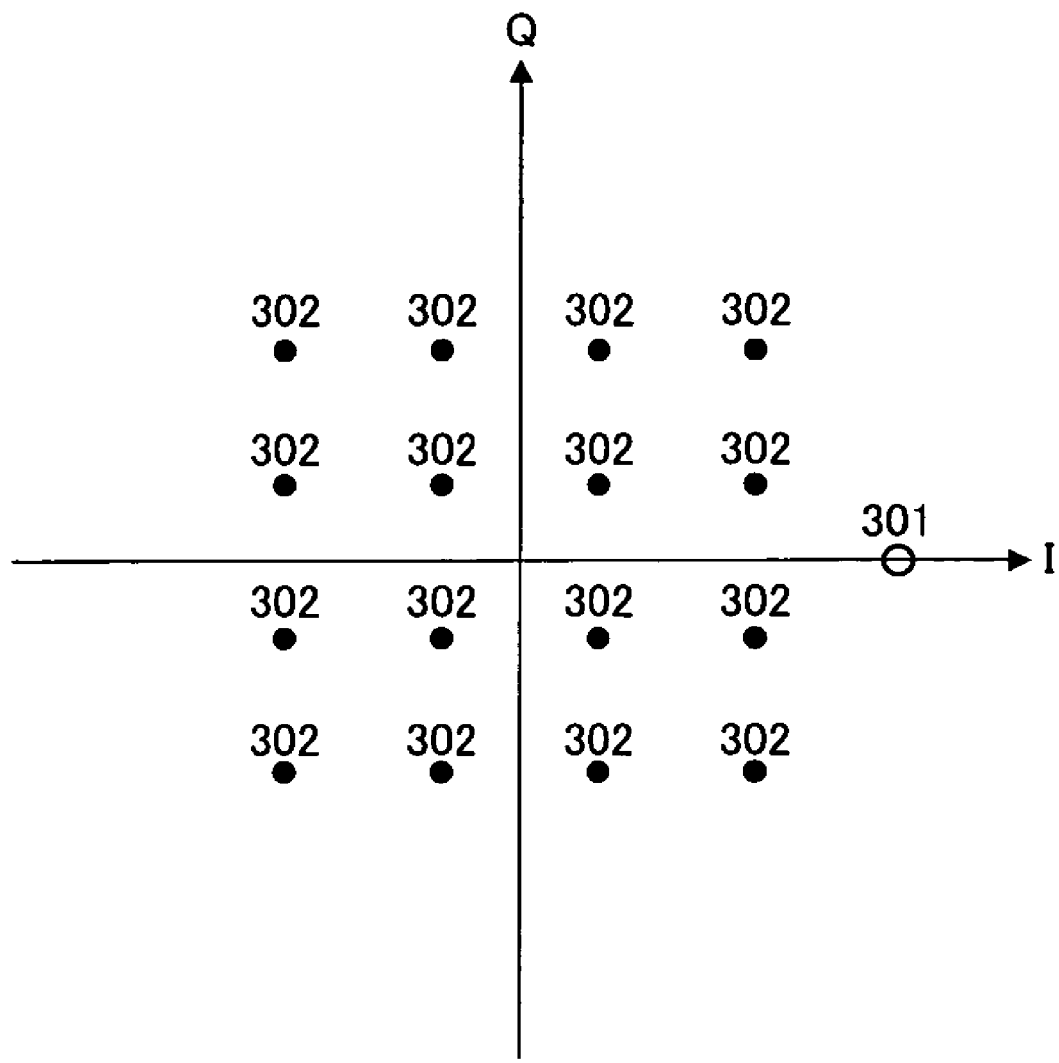
FIG. 3 is a layout of signal points of 16QAM and known pilot symbol on an in-phase I-quadrature Q plane.
Figure 4:
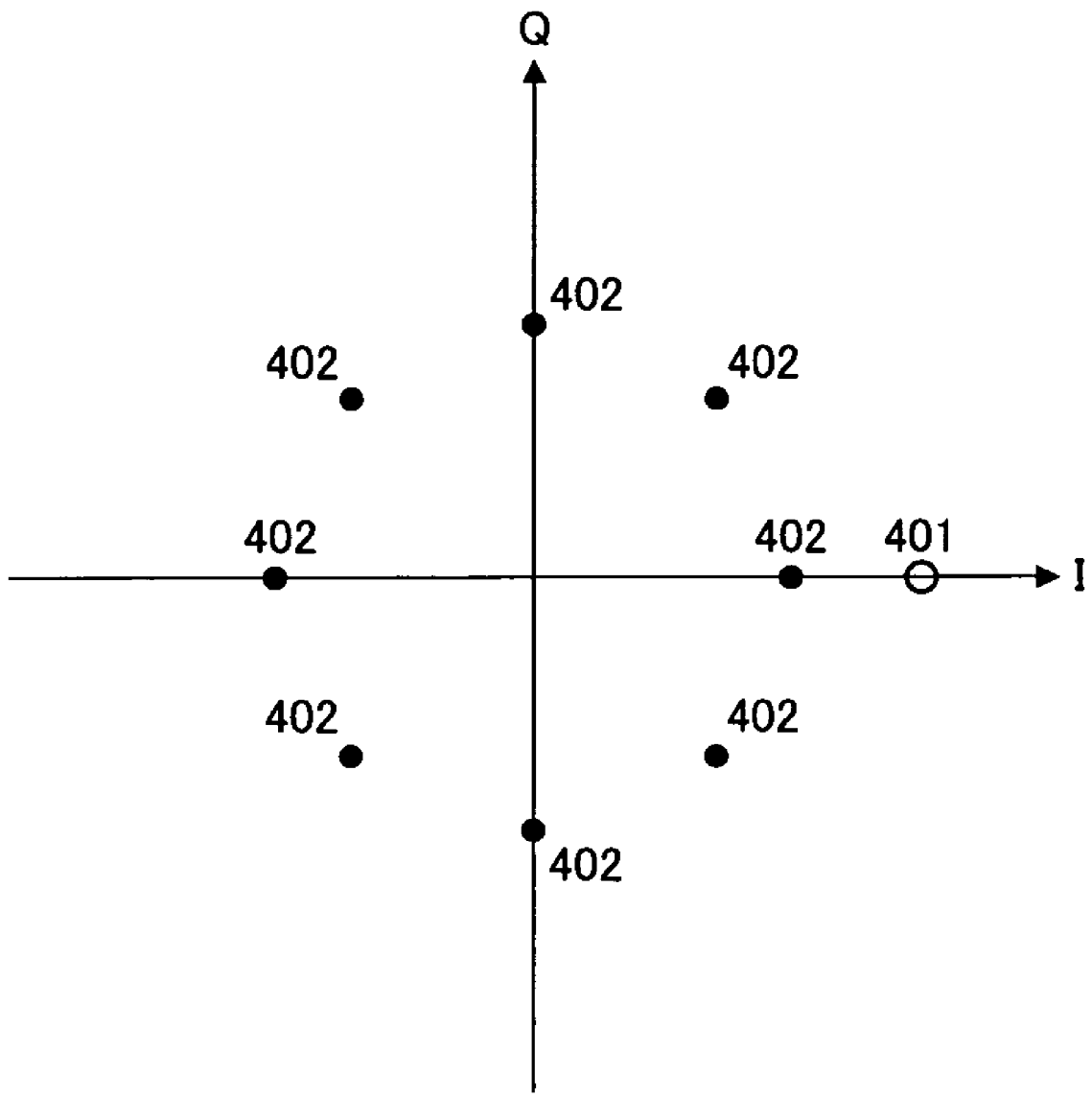
FIG. 4 is a layout of signal points of 8PSK modulation and known pilot symbol on an in-phase I-quadrature Q plane.
Figure 5:
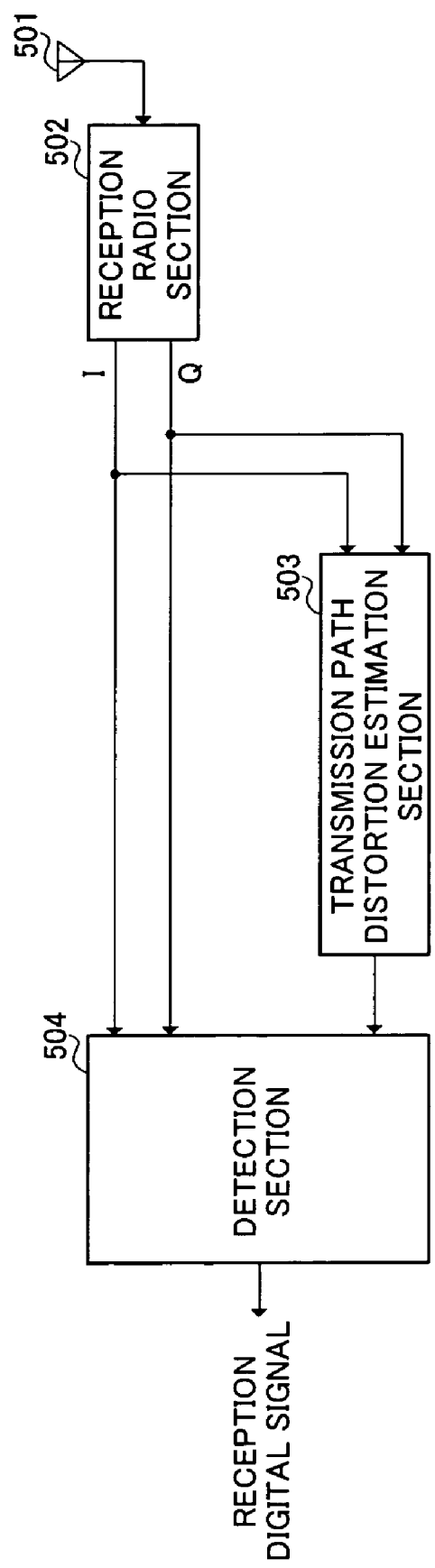
FIG. 5 is a block diagram showing a configuration of a reception apparatus according to Embodiment 1 of the present invention.

FIG. 3 shows a signal point layout according to the 16QAM modulation system on the in-phase I-quadrature Q plane and signal point layout of known pilot symbol. Signal point 301 is the signal point of known pilot symbol and signal points 302 are the signal points of 16QAM modulation symbol. FIG. 4 shows a signal point layout according to the 8PSK modulation system on the in-phase I-quadrature Q plane and signal point layout of a known pilot symbol. Signal point 401 is the signal point of known pilot symbol and signal points 402 are the signal points of 8PSK modulation symbol FIG. 5 is a block diagram showing a configuration of the reception apparatus according to this embodiment. As shown in FIG. 5, the reception apparatus according to this Embodiment mainly consists of reception antenna 501, reception radio section 502, transmission path distortion estimation section 503 and detection section 504.

Reception radio section 502 receives the radio signal received by reception antenna 501 as an input, performs predetermined radio processing and outputs the in-phase component and the quadrature component of the reception quadrature baseband signal.

Transmission path distortion estimation section 503 receives the in-phase component and the quadrature component of the quadrature baseband signal as inputs, extracts the signal of the known pilot symbol shown in FIG. 3 and FIG. 4 above, estimates the amount of transmission path distortion from the reception condition of the known pilot symbol and outputs the amount of transmission path distortion to detection section 504.

Detection section 504 receives the in-phase component and the quadrature component of the quadrature baseband signal as inputs, detects information symbol based on the amount of transmission path distortion and outputs a digital reception signal.

Thus, changing the interval for inserting known pilot symbols and the modulation system of information symbol according to the communication situation such as fluctuations in the transmission path and the level of the reception signal can improve both the data transmission efficiency and the quality of data at the same time.

Here, this embodiment explains two intervals for inserting known pilot symbols, but the present invention is not limited to this. Furthermore, this embodiment explains two kinds of the modulation systems of information symbol, namely 16QAM and the 8PSK modulation, but the present invention is not limited to these.

Furthermore, this embodiment only explains the frame configuration of information symbol and known pilot symbol shown in FIG. 2, but since it is also possible to consider a frame configuration in which signals such as symbol for synchronization to adjust timing between the receiver and transmitter and symbol for error correction on the receiver side are inserted, the present invention is not limited to the frame configuration composed of only information symbol and known pilot symbol.

Embodiment 2

Embodiment 2 describes a digital radio communication method by which the interval for inserting BPSK modulation symbol and the modulation system of information symbol other than the above BPSK modulation symbol are changed according to the communication situation.

Figure 6:
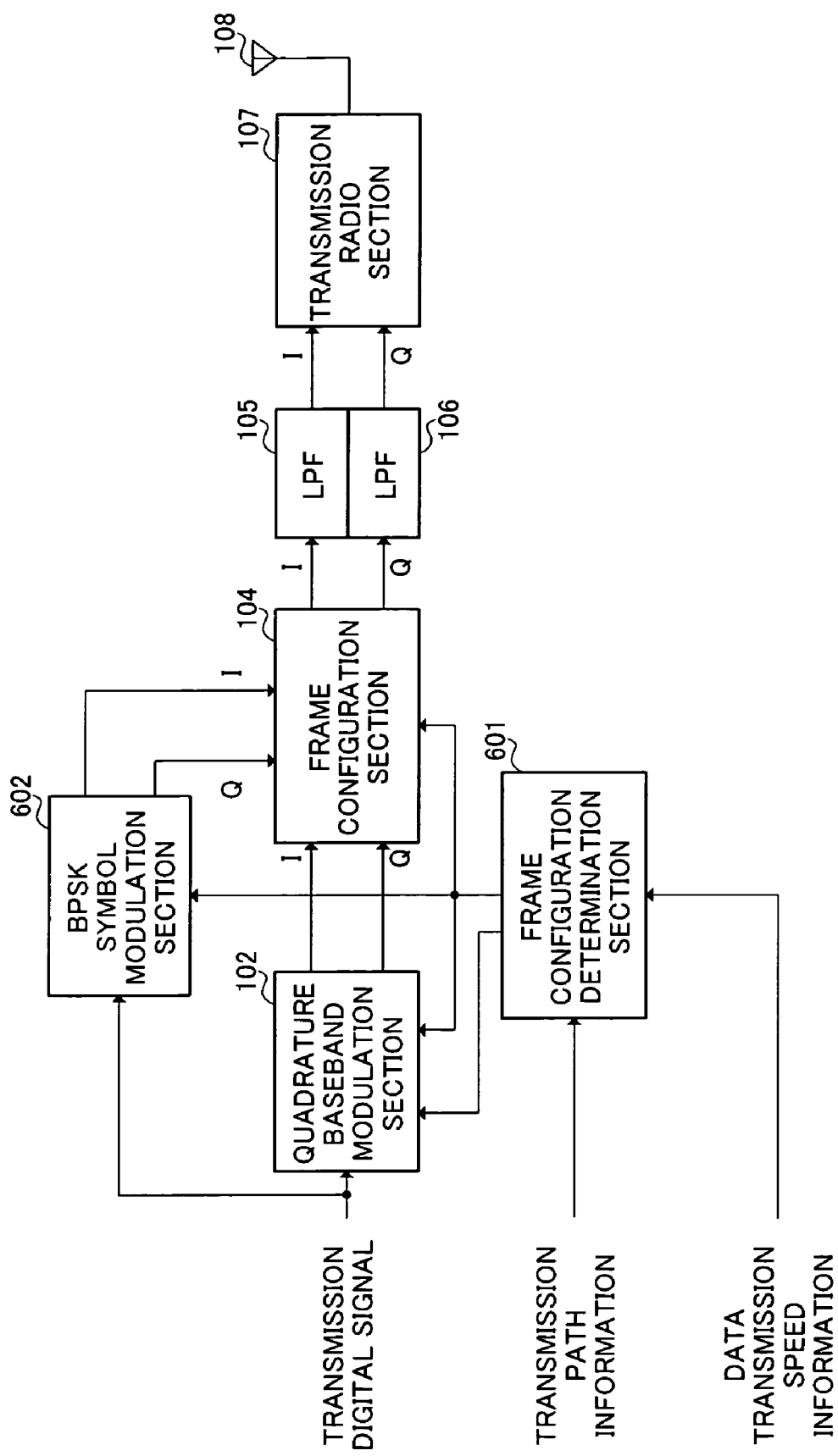
FIG. 6 is a block diagram showing a configuration of a transmission apparatus according to Embodiment 2 of the present invention.

FIG. 6 is a block diagram showing a configuration of the transmission apparatus according to this Embodiment. Here, in the transmission apparatus shown in FIG. 6, the components common to those in the transmission apparatus shown in FIG. 1 are assigned the same reference numerals as those in FIG. 1 and their explanations will be omitted.

In the transmission apparatus in FIG. 6, frame configuration determination section 601 differs in the way of operation from the frame configuration determination section 101 in FIG. 1. Also, when compared to FIG. 1, the transmission apparatus in FIG. 6 adopts the configuration with BPSK symbol modulation section 602, instead of pilot symbol generation section 103, added.

Frame configuration determination section 601 judges the communication situation, determines the interval for inserting BPSK modulation symbols and the modulation system of digital transmission signals, outputs a signal indicating the determined modulation system to quadrature baseband modulation section 102 and outputs a signal indicating the determined interval for inserting BPSK modulation symbols to quadrature baseband modulation section 102, BPSK symbol modulation section 602 and frame configuration section 104.

BPSK symbol modulation section 602 performs BPSK-modulation on the digital transmission signal at the timing indicated from frame configuration determination section 601 and outputs the in-phase component and the quadrature component of the BPSK modulation symbol to frame configuration section 104.

Figure 7:
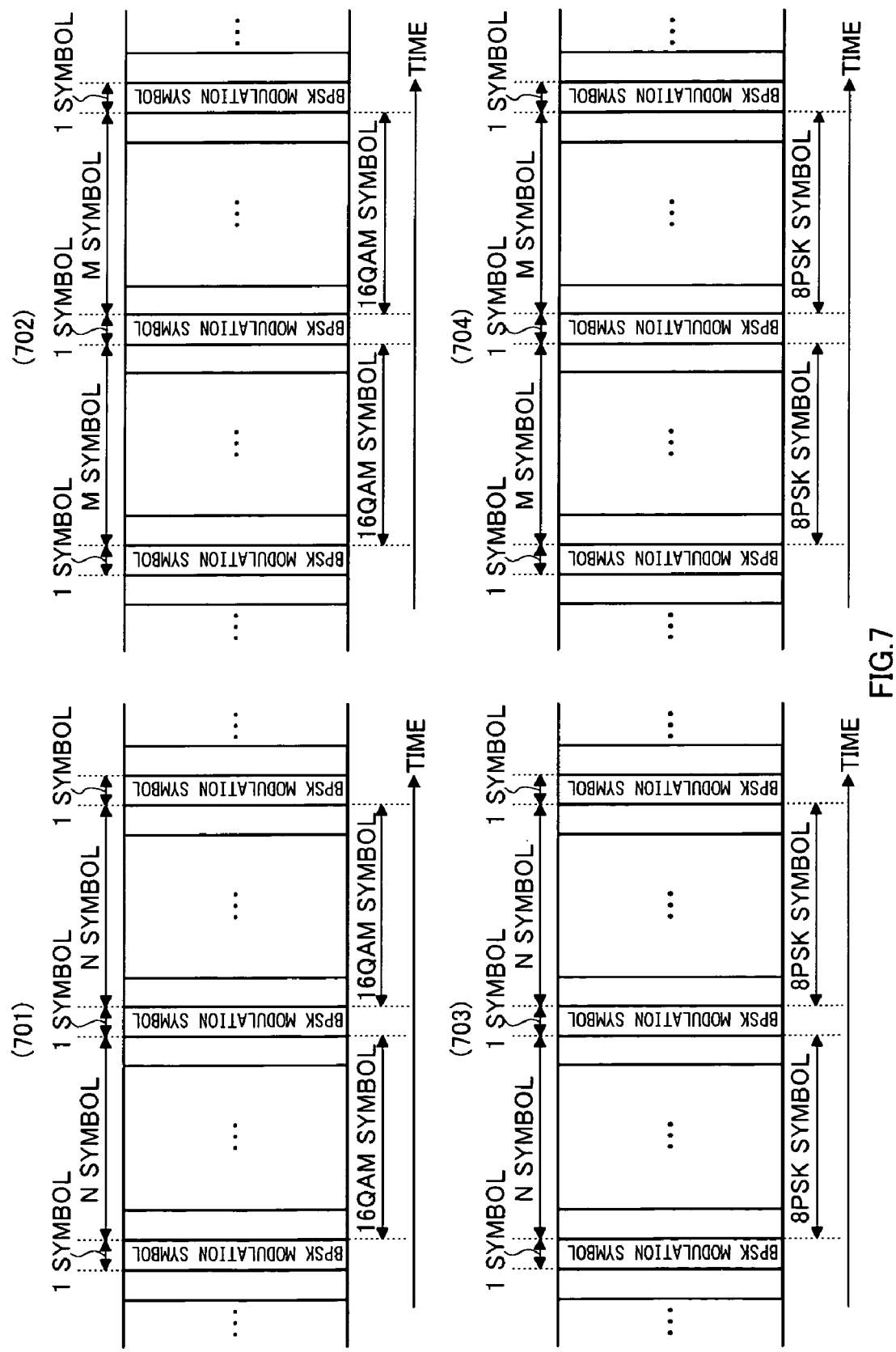
FIG. 7 illustrates examples of a frame configuration of a signal transmitted from the transmission apparatus of Embodiment 2 of the present invention.

FIG. 7 illustrates examples of a frame configuration of a signal transmitted from the transmission apparatus of this embodiment and shows a time-symbol relationship. (701) is a frame configuration where the modulation system of information symbol is 16QAM and the interval between BPSK modulation symbols is N symbols. (702) is a frame configuration where the modulation system of information symbol is 16QAM and the interval between BPSK modulation symbols is M symbols. (703) is a frame configuration where the modulation system of information symbol is 8PSK modulation and the interval between BPSK modulation symbols is N symbols. (704) is a frame configuration where the modulation system of information symbol is 8PSK modulation and the interval between BPSK modulation symbols is M symbols. Suppose N<M at this time.

Frame configuration determination section 601 selects one of (701), (702), (703) or (704) in FIG. 7 as the optimal frame configuration based on the transmission path information and the request data transmission speed information.

For example, in the case of high-speed fading, frame configuration determination section 601 sacrifices data transmission efficiency on the receiving side and selects the frame configuration of either (701) or (703) in FIG. 7 so as to insert BPSK modulation symbols at shorter intervals to prevent deterioration of the data demodulation error rate and maintain the quality of data. On the other hand, in the case of low-speed fading, frame configuration determination section 601 selects the frame configuration of either (702) or (704) in FIG. 7 so as to insert BPSK modulation symbols at longer intervals to improve the data transmission efficiency.

Furthermore, when the level of the reception signal is large, frame configuration determination section 601 gives priority to data transmission efficiency on the receiving side and selects the frame configuration of either (701) or (702) in the FIG. 7 that adopts adopting 16QAM as the modulation system of information symbol. On the other hand, when the level of the reception signal is small, frame configuration determination section 601 gives priority to increasing error resiliency features while sacrificing data transmission efficiency on the receiving side and selects the frame configuration of either (703) or (704) in FIG. 7 adopting 8PSK as the modulation system of information symbol.

Figure 8:
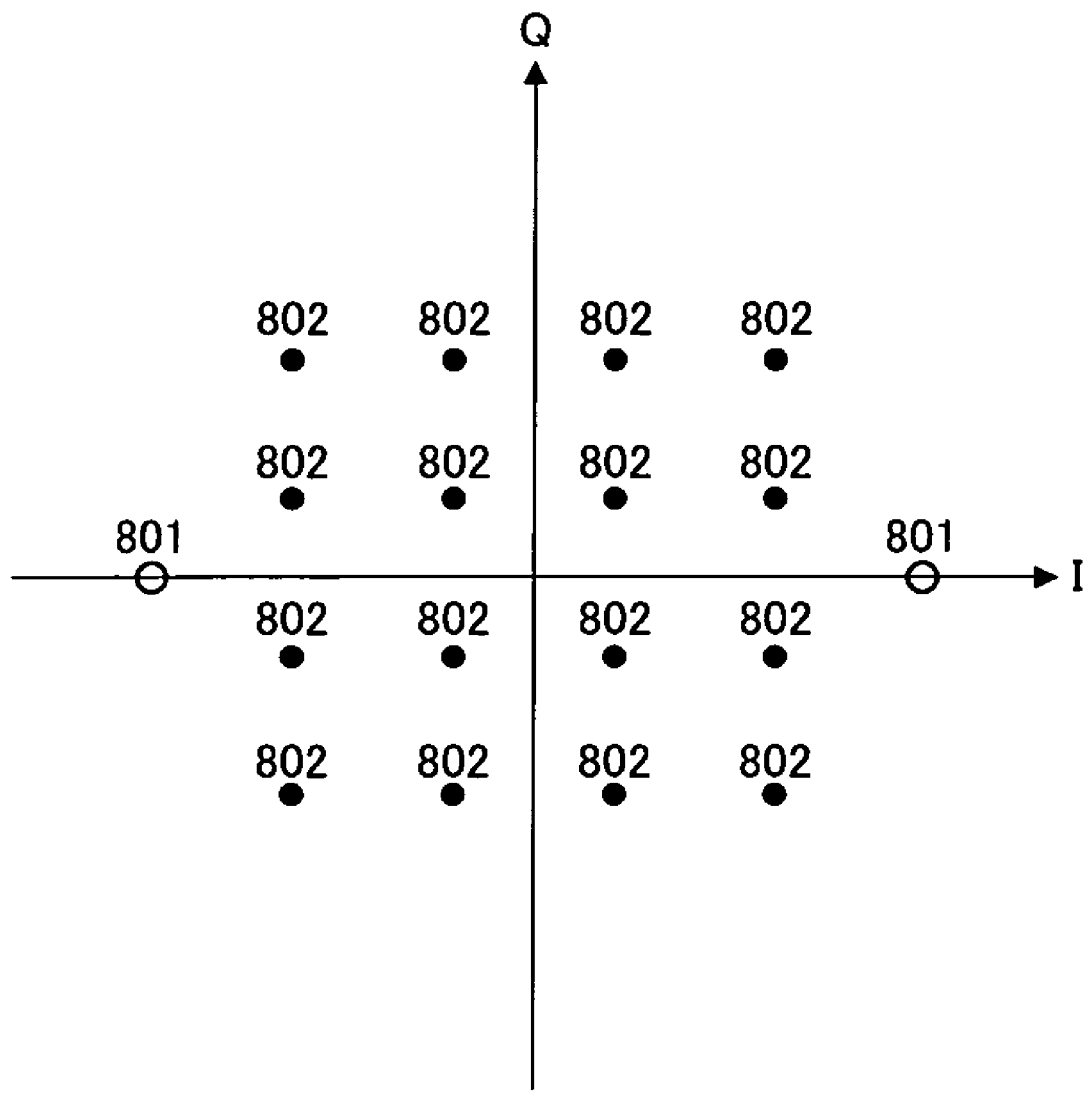
FIG. 8 is a layout of signal points of 16QAM and BPSK modulation on an in-phase I-quadrature Q plane.
Figure 9:
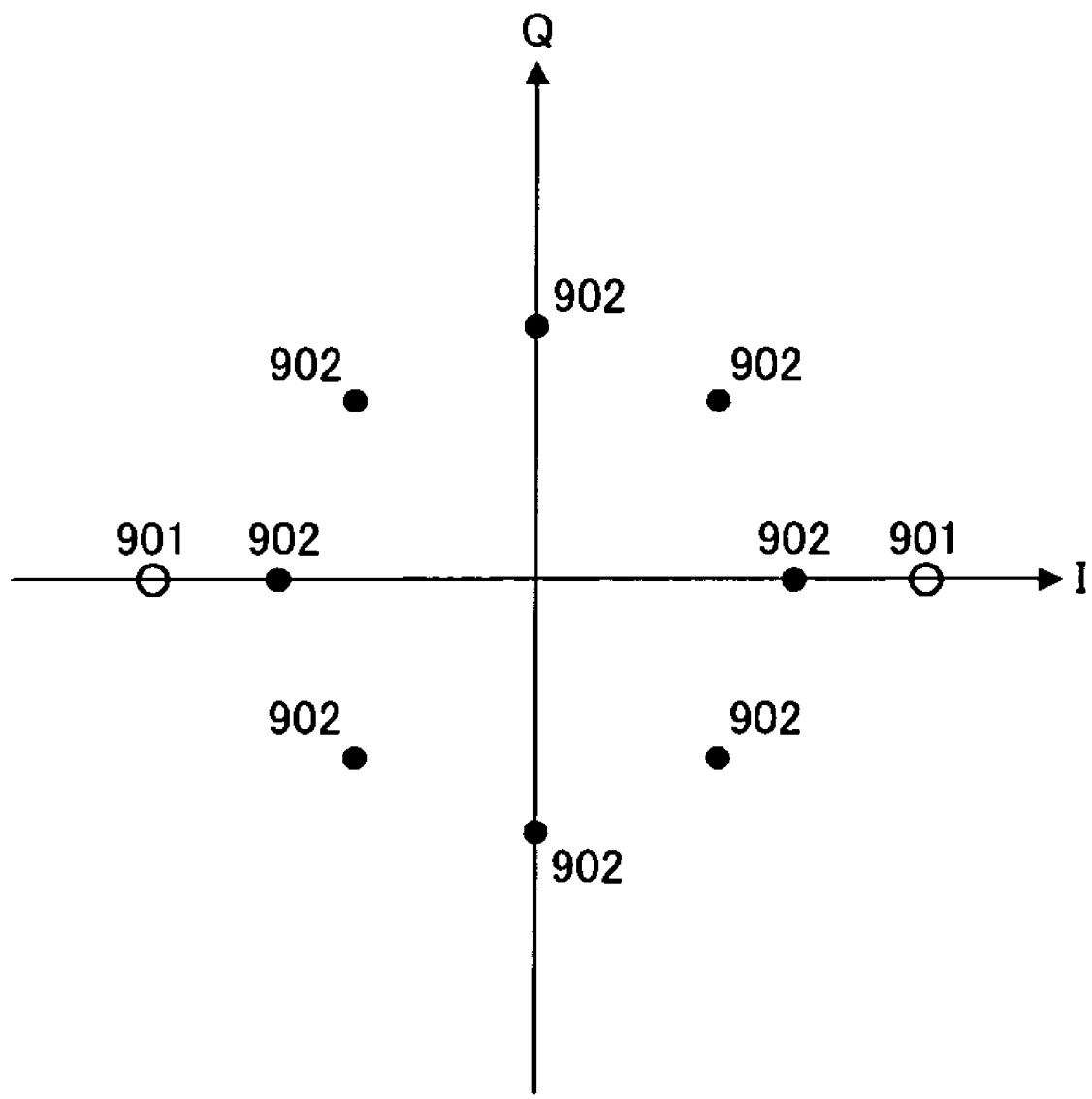
FIG. 9 is a layout of signal points of 8PSK modulation and BPSK modulation on an in-phase I-quadrature Q plane.
Figure 10:
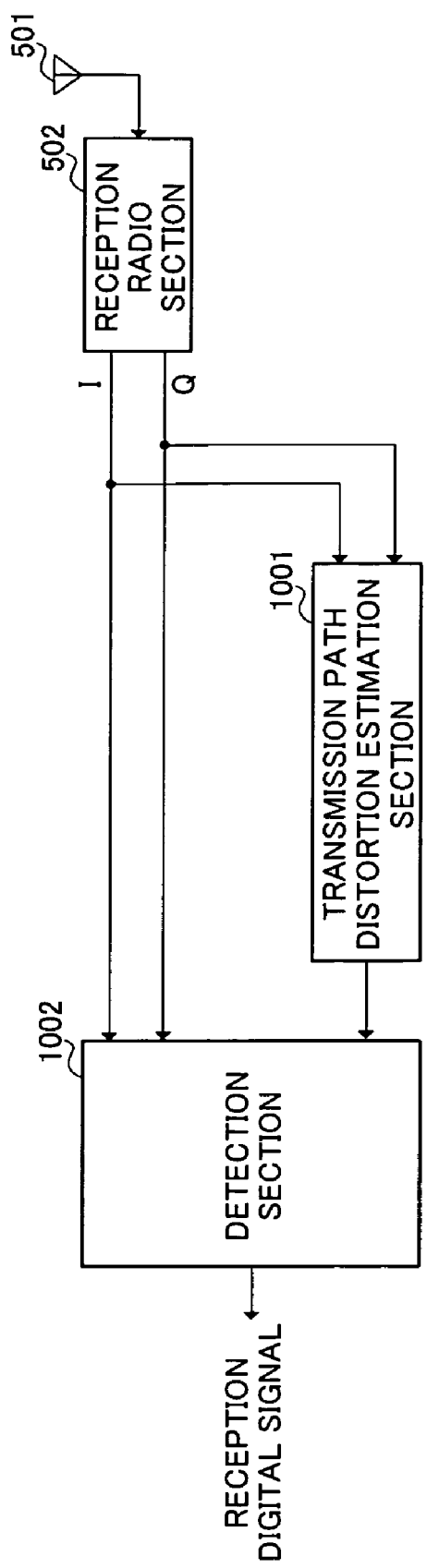
FIG. 10 is a block diagram showing a configuration of reception apparatus according to Embodiment 2 of the present invention.

FIG. 8 shows a signal point layout according to the 16QAM modulation system on the in-phase I-quadrature Q plane and signal point layout of BPSK modulation symbol. Signal points 801 are the signal points of BPSK modulation symbol and signal points 802 are the signal points of 16QAM modulation symbol. FIG. 9 shows a signal point layout according to the 8PSK modulation system on the in-phase I-quadrature Q plane and signal point layout of BPSK modulation symbol. Signal points 901 are the signal points of BPSK modulation symbol and signal points 902 are the signal points of 8PSK modulation symbol FIG. 10 is a block diagram showing a configuration of the reception apparatus according to this Embodiment. In the reception apparatus shown in FIG. 10, the components common to the reception apparatus shown in FIG. 5 are assigned the same reference numerals as those in FIG. 5 and their explanations will be omitted.

In the reception apparatus in FIG. 10, transmission path distortion estimation section 1001 differs in the way of operation from transmission path distortion estimation section 503 in FIG. 5 and detection section 1002 differs in the way of operation from detection section 504 in FIG. 5.

Transmission path distortion estimation section 1001 receives the in-phase component and the quadrature component of the quadrature baseband signal as inputs, extracts the signals of the BPSK modulation symbol shown in FIG. 8 and FIG. 9 above, estimates the amount of transmission path distortion from the reception condition of the BPSK modulation symbol and outputs the amount of transmission path distortion to detection section 1002.

Detection section 1002 receives the in-phase component and the quadrature component of the quadrature baseband signal as inputs, detects information symbol and BPSK modulation symbol based on the amount of transmission path distortion and outputs a digital reception signal.

Thus, in this embodiment, by sending information with BPSK modulation symbols inserted therein, instead of known pilot symbols, it is possible to improve the transmission speed compared with Embodiment 1.

Here, this embodiment describes two intervals for inserting BPSK modulation symbols but the present invention is not limited to these. Also, this embodiment describes two modulation systems of information symbol, namely 16QAM and 8PSK modulation, but the present invention is not limited to these.

Furthermore, this embodiment describes the frame configuration of only information symbol and BPSK modulation symbol shown in FIG. 7 but the present invention is not limited to this frame configuration.

Embodiment 3

Embodiment 3 describes a digital radio communication method by which the interval for inserting QPSK modulation symbols and the modulation system of information symbol other than the above QPSK modulation symbols are changed according to the communication situation.

Figure 11:
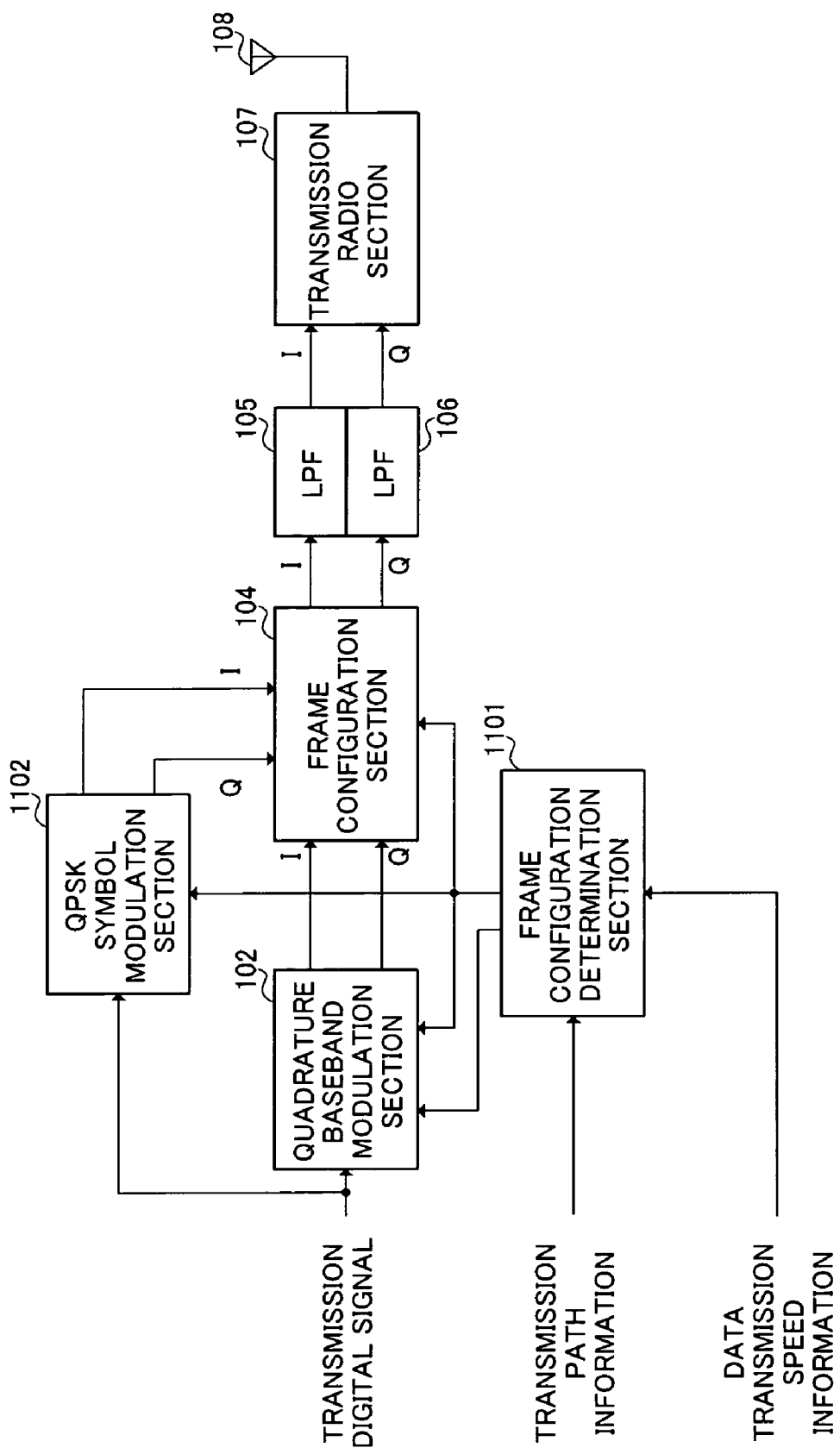
FIG. 11 is a block diagram showing a configuration of a transmission apparatus according to Embodiment 3 of the present invention.

FIG. 11 is a block diagram showing a configuration of the transmission apparatus according to this Embodiment. In the transmission apparatus shown in FIG. 11, the components common to those in the transmission apparatus shown in FIG. 1 are assigned the same reference numerals as those in FIG. 1 and their explanations will be omitted.

In the transmission apparatus in FIG. 11, frame configuration determination section 1101 differs in the way of operation from the frame configuration determination section 101 in FIG. 1. Also, when compared to FIG. 1, the transmission apparatus in FIG. 11 adopts a configuration having QPSK symbol modulation section 1102 instead of pilot symbol generation section 103.

Frame configuration determination section 1101 judges the communication situation, determines the interval for inserting QPSK modulation symbols and the modulation system of digital transmission signals, outputs a signal indicating the determined modulation system to quadrature baseband modulation section 102 and outputs a signal indicating the determined interval for inserting QPSK modulation symbols to quadrature baseband modulation section 102, QPSK symbol modulation section 1102 and frame configuration section 104.

QPSK symbol modulation section 1102 performs QPSK-modulation on a digital transmission signal at the timing indicated from frame configuration determination section 1101 and outputs the in-phase component and the quadrature component of the QPSK modulation symbol to frame configuration section 104.

Figure 12:
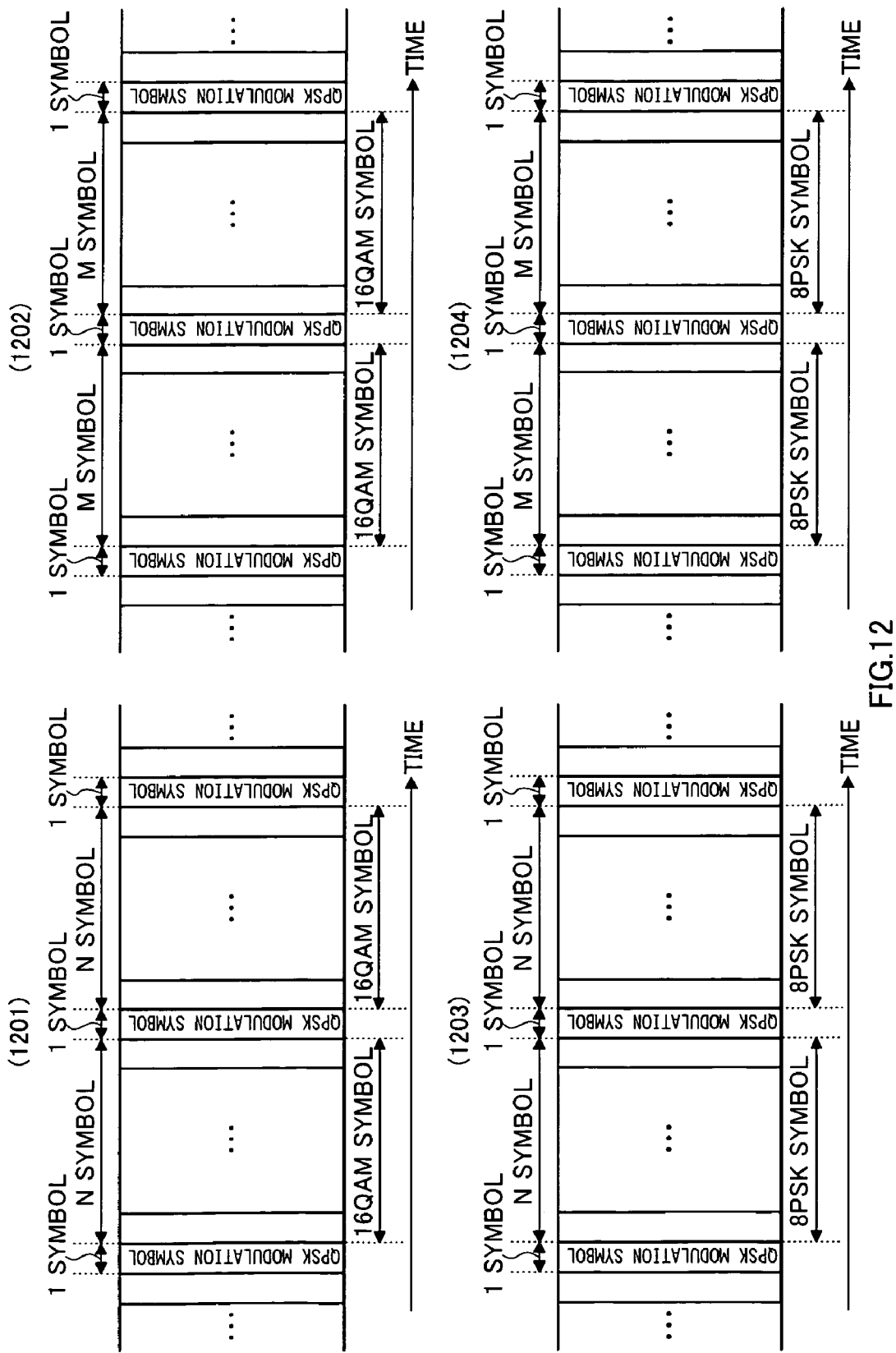
FIG. 12 illustrates examples of a frame configuration of a signal transmitted from the transmission apparatus of Embodiment 3 of the present invention.

FIG. 12 illustrates examples of a frame configuration of a signal transmitted from the transmission apparatus of this embodiment and shows a time-symbol relationship. (1201) is a frame configuration where the modulation system of information symbol is 16QAM and the interval between QPSK modulation symbols is N symbols. (1202) is a frame configuration where the modulation system of information symbol is 16QAM and the interval between QPSK modulation symbols is M symbols. (1203) is a frame configuration where the modulation system of information symbol is 8PSK modulation and the interval between QPSK modulation symbols is N symbols. (1204) is a frame configuration where the modulation system of information symbol is 8PSK modulation and the interval between QPSK modulation symbols is M symbols. Suppose N<M at this time.

Frame configuration determination section 1101 selects one of (1201), (1202), (1203) or (1204) in FIG. 12 as the optimal frame configuration based on the transmission path information and the request data transmission speed information.

For example, in the case of high-speed fading, frame configuration determination section 1101 sacrifices data transmission efficiency on the receiving side and selects the frame configuration of either (1201) or (1203) in FIG. 12 so as to insert QPSK modulation symbols at shorter intervals to prevent deterioration of the data demodulation error rate and maintain the quality of data. On the other hand, in the case of low-speed fading, frame configuration determination section 1101 selects the frame configuration of either (1202) or (1204) in FIG. 12 so as to insert QPSK modulation symbols at longer intervals to improve the data transmission efficiency.

Furthermore, when the level of the reception signal is large, frame configuration determination section 1101 gives priority to data transmission efficiency on the receiving side and selects the frame configuration of either (1201) or (1202) in FIG. 12 that adopts 16QAM as the modulation system of information symbol. On the other hand, when the level of the reception signal is small, frame configuration determination section 1101 gives priority to increasing error resiliency features while sacrificing data transmission efficiency on the receiving side and selects the frame configuration of either (1203) or (1204) in FIG. 12 that adopts 8PSK as the modulation system of information symbol.

Figure 13:
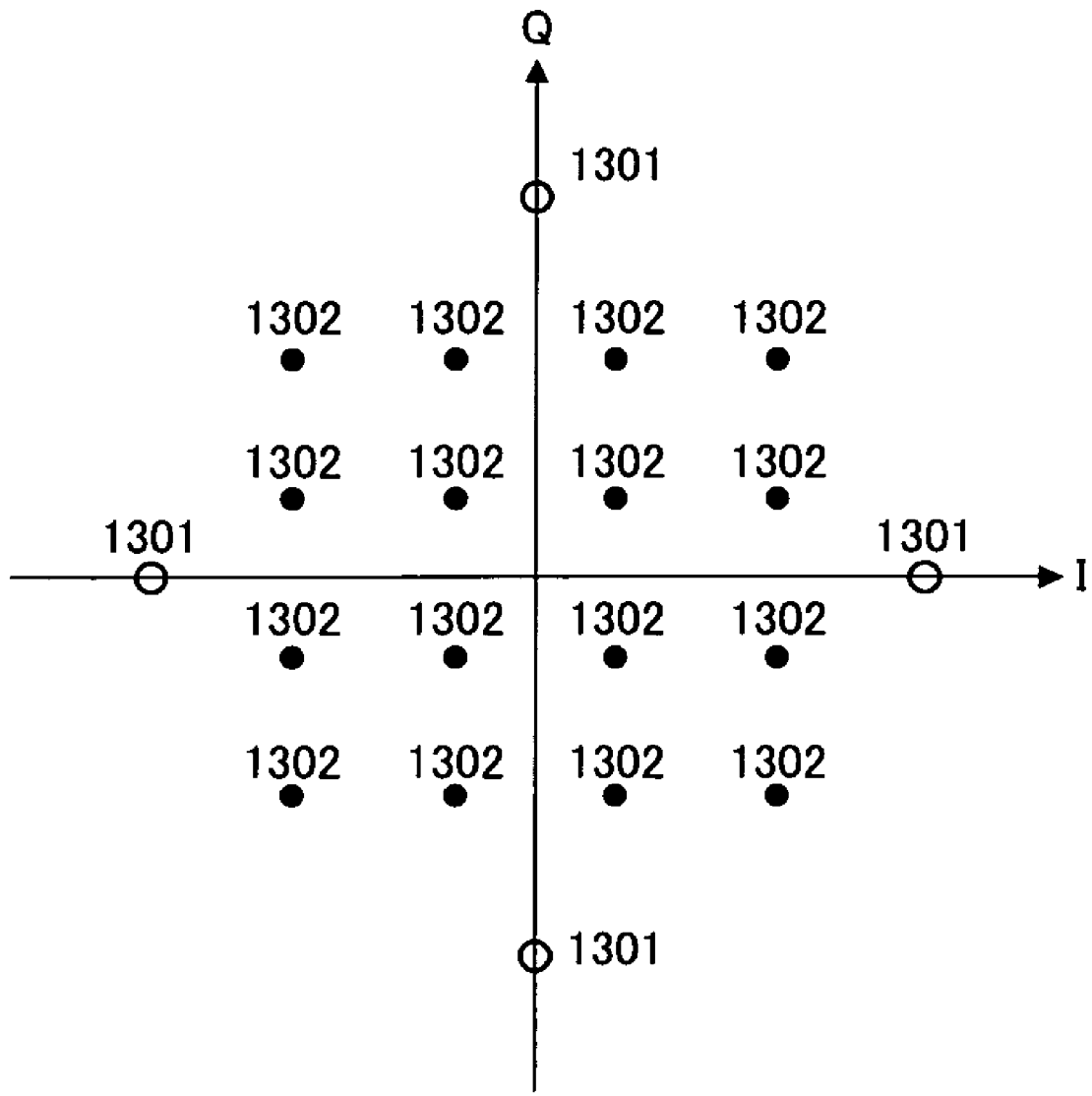
FIG. 13 is a layout of signal points of 16QAM and QPSK modulation on an in-phase I-quadrature Q plane.
Figure 14:
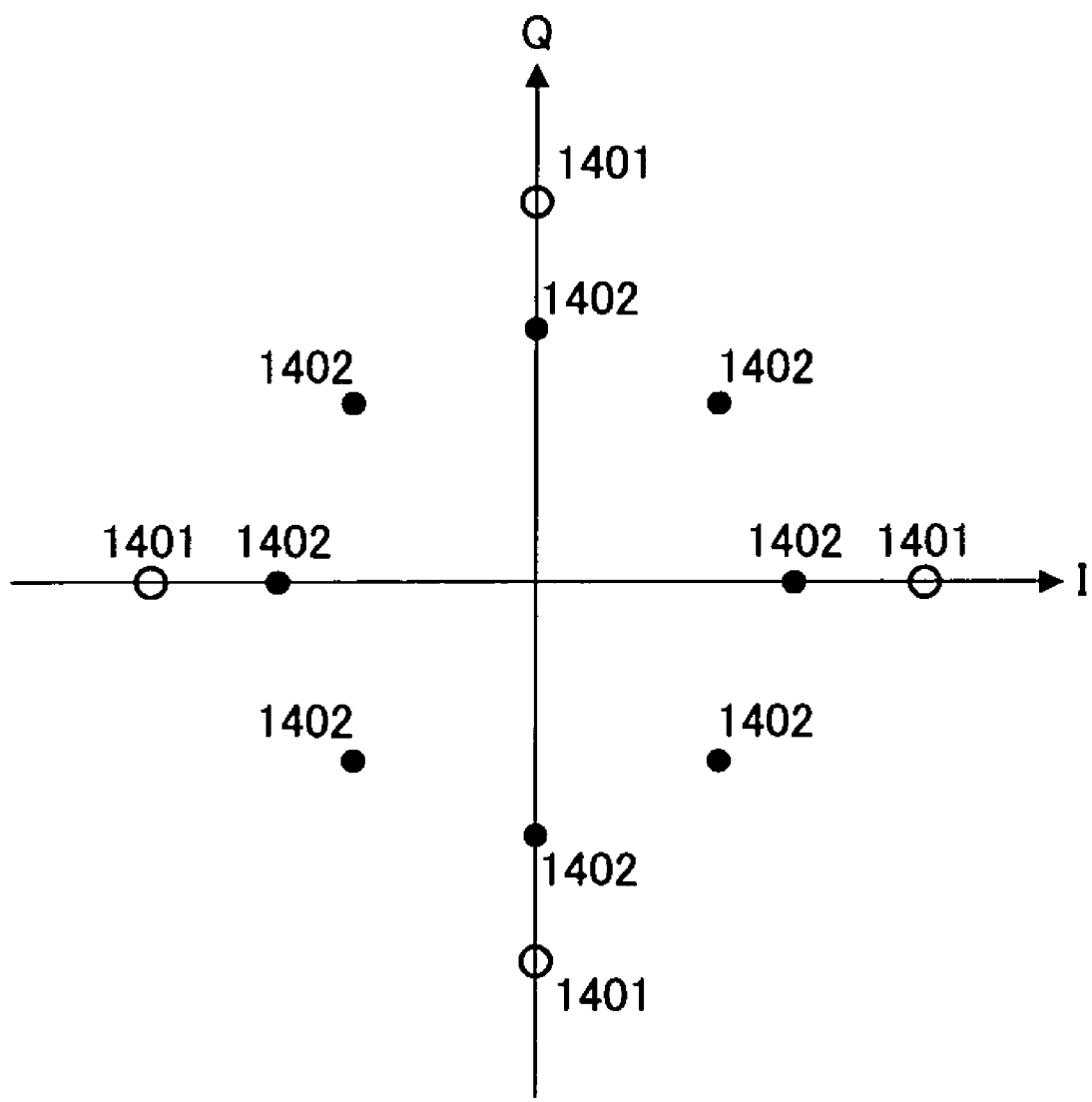
FIG. 14 is a layout of signal points of 8PSK modulation and QPSK modulation on an in-phase I-quadrature Q plane.

FIG. 13 shows a signal point layout according to the 16QAM modulation system on the in-phase I-quadrature Q plane and signal point layout of QPSK modulation symbol. Signal points 1301 are the signal points of QPSK modulation symbol and signal points 1302 are the signal points of 16QAM modulation symbol. FIG. 14 shows a signal point layout according to the 8PSK modulation system on the in-phase I-quadrature Q plane and signal point layout of QPSK modulation symbol. Signal points 1401 are the signal points of QPSK modulation symbol and signal points 1402 are the signal points of 8PSK modulation symbol.

Figure 15:
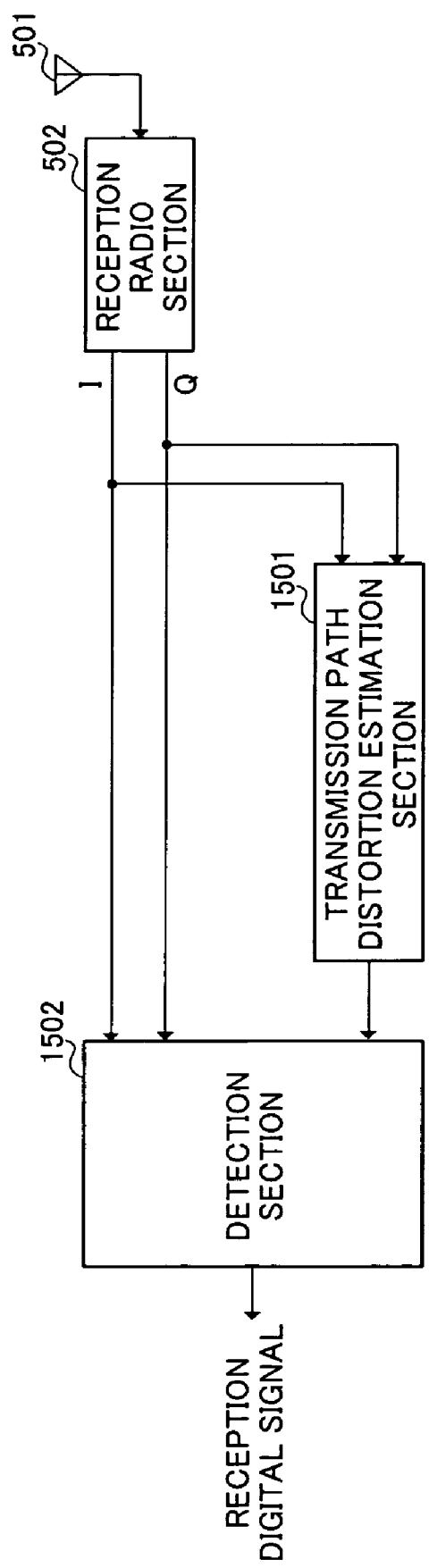
FIG. 15 is a block diagram showing a configuration of a reception apparatus according to Embodiment 3 of the present invention.

FIG. 15 is a block diagram showing a configuration of the reception apparatus according to this embodiment. In the reception apparatus shown in FIG. 15, the components common to the reception apparatus shown in FIG. 5 are assigned the same reference numerals as those in FIG. 5 and their explanations will be omitted.

In the reception apparatus in FIG. 15, transmission path distortion estimation section 1501 differs in the way of operation from transmission path distortion estimation section 503 in FIG. 5 and detection section 1502 differs in the way of operation from detection section 504 in FIG. 5.

Transmission path distortion estimation section 1501 receives the in-phase component and the quadrature component of the quadrature baseband signal as inputs, extracts the signals of the QPSK modulation symbol shown in FIG. 13 and FIG. 14 above, estimates the amount of transmission path distortion from the reception condition of the QPSK modulation symbol and outputs the amount of transmission path distortion to detection section 1502.

Detection section 1502 receives the in-phase component and the quadrature component of the quadrature baseband signal as inputs, detects information symbol and QPSK modulation symbols based on the amount of transmission path distortion and outputs a digital reception signal.

Thus, in this embodiment, by sending information with QPSK modulation symbols inserted therein instead of known pilot symbols, it is possible to improve the transmission speed compared with Embodiment 1 and Embodiment 2.

Here, this embodiment describes two intervals of inserting QPSK modulation symbols but the present invention is not limited to these. Also, this embodiment describes two modulation systems of information symbol, namely 16QAM and 8PSK modulation, but the present invention is not limited to these.

Furthermore, this embodiment describes the frame configuration of only information symbol and QPSK modulation symbol as shown in FIG. 12, but the present invention is not limited to this frame configuration.

Embodiment 4

Embodiment 4 describes a digital radio communication method by which the modulation system of information symbol is changed according to the communication situation and when the modulation system of information symbol has a level of 8 or higher, known pilot symbols are inserted at insertion intervals subject to change according to the communication situation.

Figure 16:
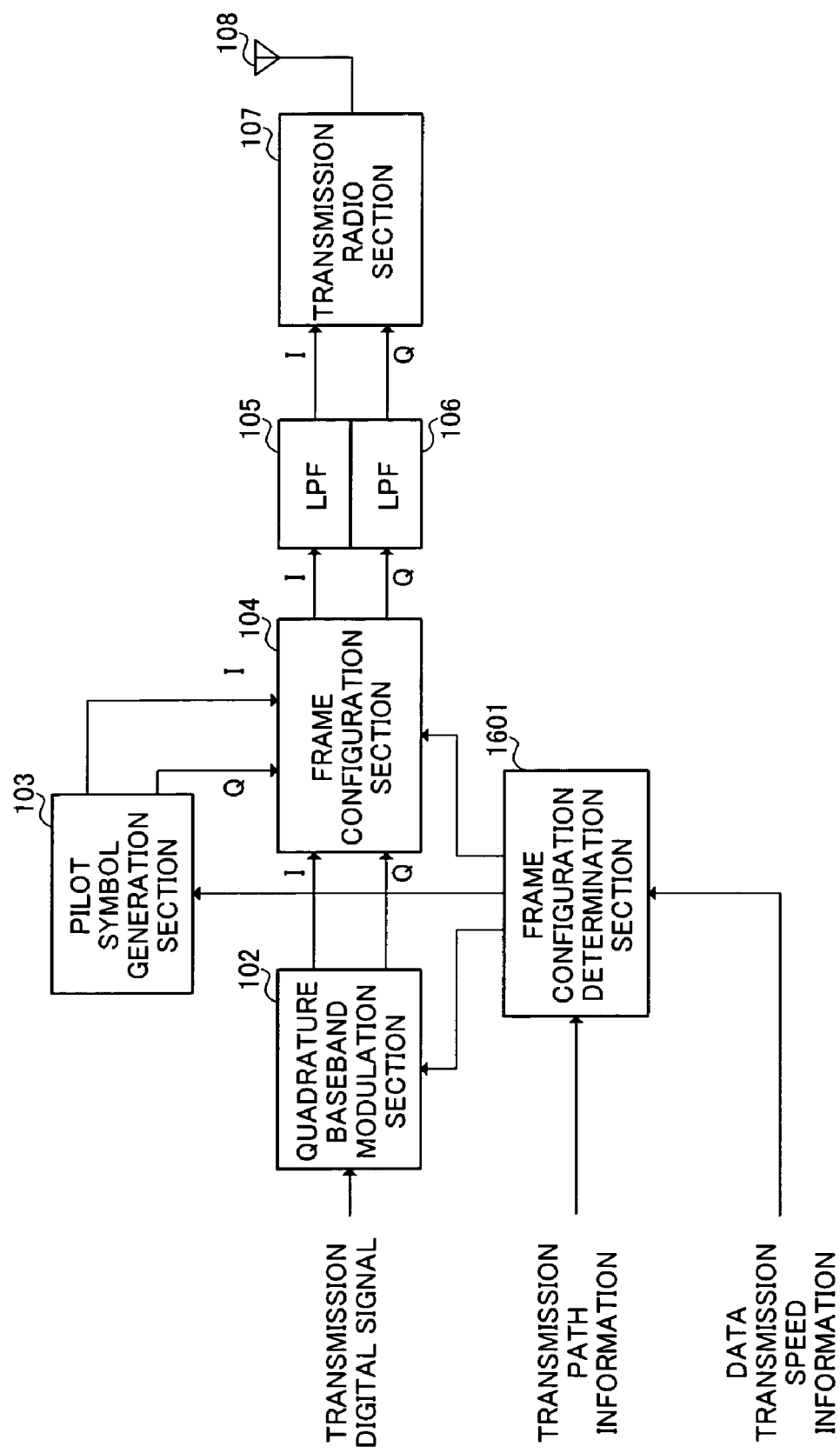
FIG. 16 is a block diagram showing a configuration of a transmission apparatus according to Embodiment 4 of the present invention.

FIG. 16 is a block diagram showing a configuration of the transmission apparatus according to this Embodiment. In the transmission apparatus shown in FIG. 16, the components common to those in the transmission apparatus shown in FIG. 1 are assigned the same reference numerals as those in FIG. 1 and their explanations will be omitted.

In the transmission apparatus in FIG. 16, frame configuration determination section 1601 differs in the way of operation from the frame configuration determination section 101 in FIG. 1.

Frame configuration determination section 1601 determines the modulation system of digital transmission signals based on the communication situation and outputs a signal indicating the determined modulation system to quadrature baseband modulation section 102. Also, when the determined modulation system uses 8 or more-levels, frame configuration determination section 1601 determines the interval of inserting a pilot symbol based on the communication situation and outputs a signal indicating the determined interval of inserting the pilot symbol to frame configuration section 104. Also, when the level of the determined modulation system is less than 8, frame configuration determination section 1601 outputs a signal giving an instruction to stop generating pilot symbols to pilot symbol generation section 103.

Pilot symbol generation section 103 generates known pilot symbol between the transmitting side and the receiving side and outputs the in-phase component and the quadrature component of the known pilot symbol to frame configuration section 104. However, when instructed to stop generating pilot symbols from frame configuration determination section 1601, pilot symbol generation section 103 stops operation.

Figure 17:
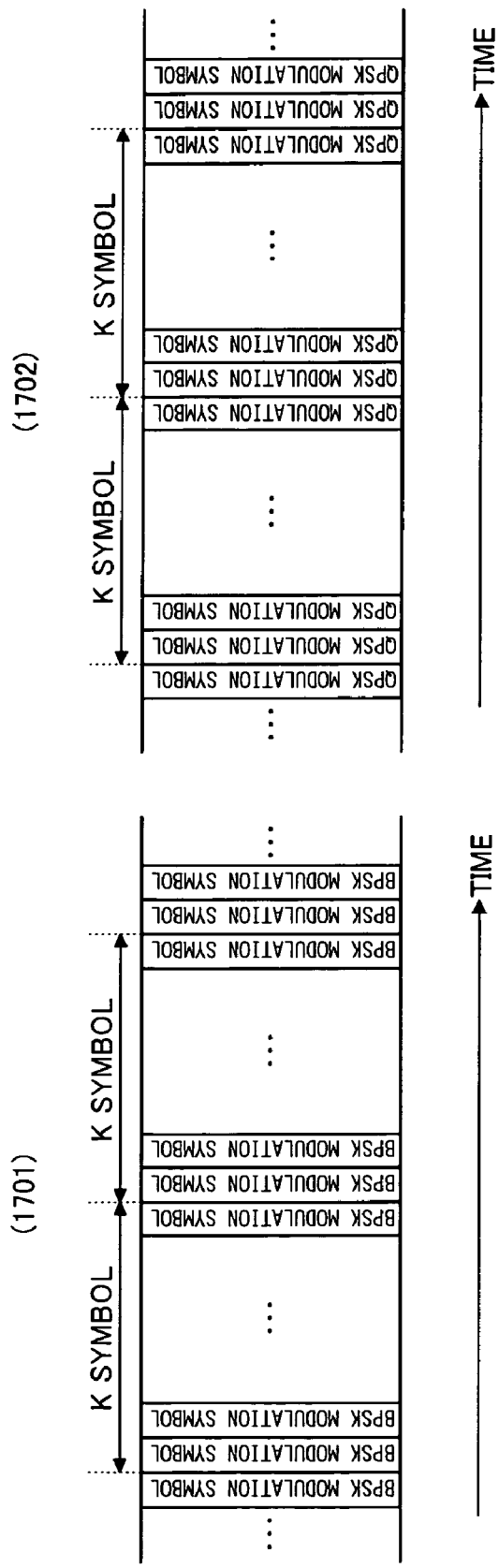
FIG. 17 illustrates examples of a frame configuration of a signal transmitted from the transmission apparatus of Embodiment 4 of the present invention.

FIG. 17 illustrates examples of a frame configuration of a signal transmitted from the transmission apparatus of this embodiment and shows a time-symbol relationship. (1701) is a frame configuration where the modulation system of information symbol is BPSK. (1702) is a frame configuration where the modulation system of information symbol is QPSK.

The ranking of the frame configurations shown in FIG. 2 and FIG. 17 in descending order of resistance to fading speed is (1701), (1702), (203), (201), (204) and (202) Furthermore, the ranking in descending order of error resiliency features is (1701), (1702), (203), (204), (201) and (202). On the other hand, the ranking in descending order of data transmission efficiency on the receiving side is (202), (201), (204), (203), (1702) and (1701).

Frame configuration determination section 1601 selects one of (201), (202), (203) or (204) in FIG. 2 or (1701) or (1702) in FIG. 17 above as the optimal frame configuration based on the transmission path information and the request data transmission speed information.

Figure 18:
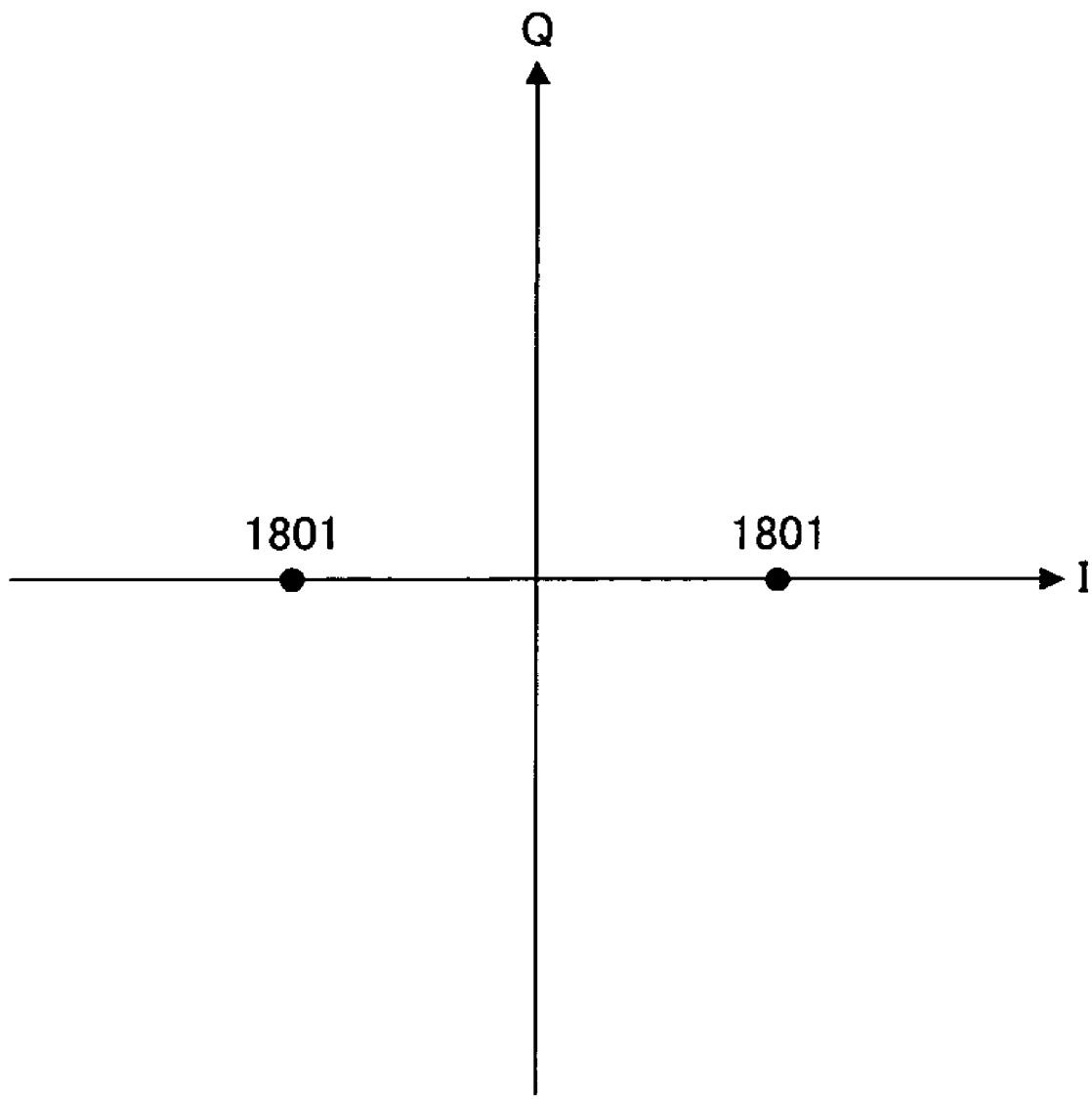
FIG. 18 is a layout of signal points of BPSK modulation on an in-phase I-quadrature Q plane.

FIG. 18 shows a signal point layout according to the BPSK modulation method on the in-phase I-quadrature Q plane and signal points 1801 are the signal points of BPSK symbol.

Figure 19:
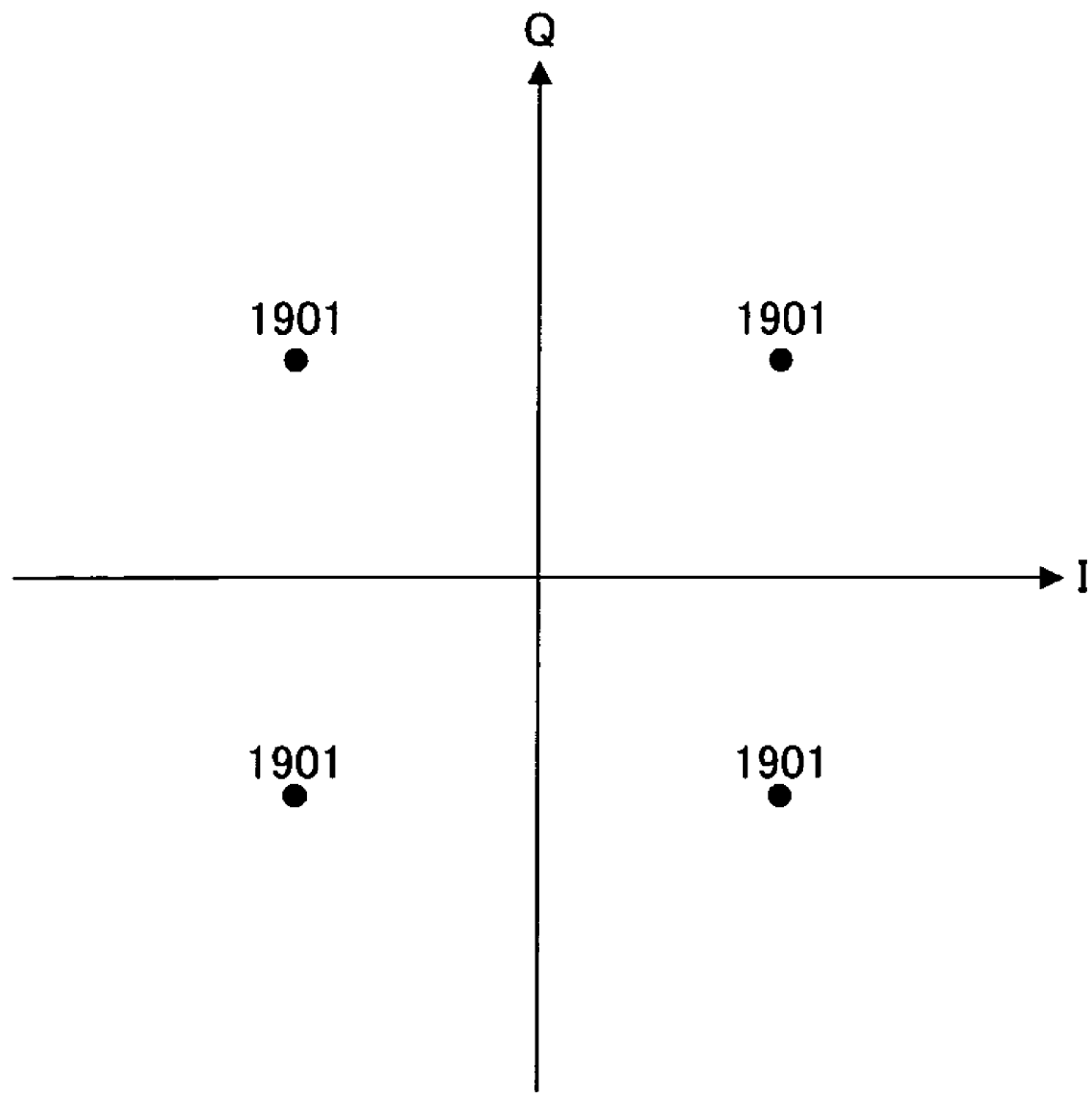
FIG. 19 is a layout of signal points of QPSK modulation on an in-phase I-quadrature Q plane.

FIG. 19 shows a signal point layout according to the QPSK modulation method on the in-phase I-quadrature Q plane and signal points 1901 are the signal points of QPSK symbol.

Figure 20:
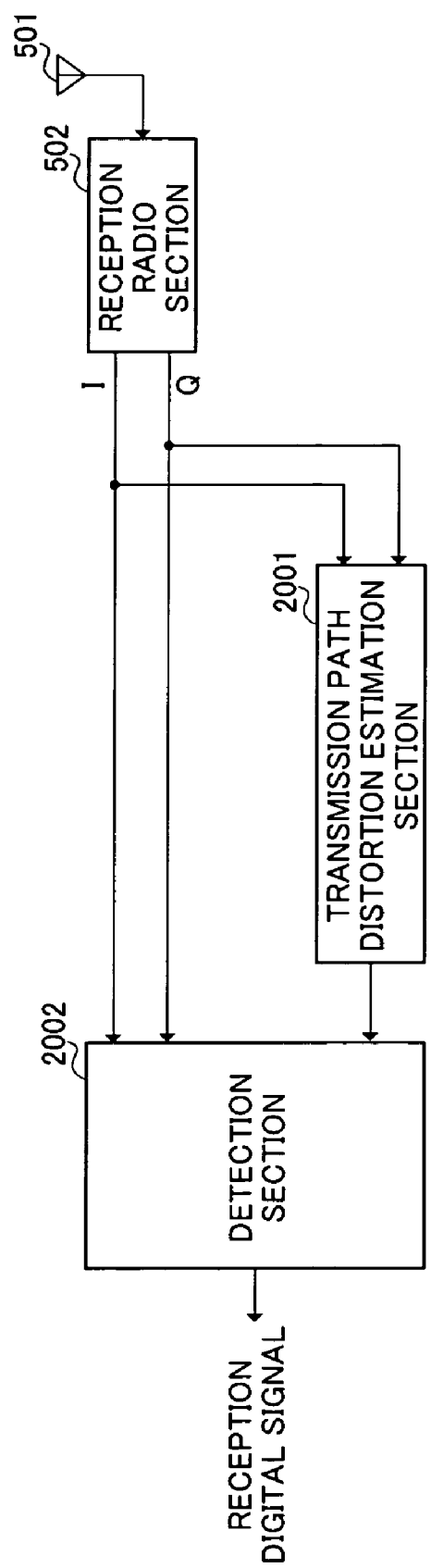
FIG. 20 is a block diagram showing a configuration of a reception apparatus according to Embodiment 4 of the present invention.

FIG. 20 is a block diagram showing a configuration of the reception apparatus according to this embodiment. In the reception apparatus shown in FIG. 20, the components common to those in the reception apparatus shown in FIG. 5 are assigned the same reference numerals as those in FIG. 5 and their explanations will be omitted.

In the reception apparatus in FIG. 20, transmission path distortion estimation section 2001 differs in the way of operation from transmission path estimation section 503 in FIG. 5 and detection section 2002 differs in the way of operation from detection section 504 in FIG. 5.

Transmission path distortion estimation section 2001 receives the in-phase component and the quadrature component of the quadrature baseband signal as inputs, estimates the amount of transmission path distortion from the reception condition of the BPSK modulation symbol shown in FIG. 18 or the QPSK modulation symbol shown in FIG. 19 and outputs the amount of transmission path distortion to detection section 2002.

Detection section 2002 receives the in-phase component and the quadrature component of the quadrature baseband signal as inputs, detects information symbols based on the amount of transmission path distortion and outputs a digital reception signal.

In this way, by changing the modulation system of information symbol according to the communication situation such as fluctuations in the transmission path and the level of the reception signal and by inserting known pilot symbols when the information symbol modulation system is a multi-level modulation system with a level of 8 or higher, and changing the interval for inserting the above known pilot symbols according to the communication situation, it is possible to improve both the data transmission efficiency and the quality of data at the same time.

Here, in this embodiment, the transmission apparatus in FIG. 16 can also have a configuration having BPSK symbol modulation section 602 shown in FIG. 6 instead of pilot symbol generation section 103.

In this case, frame configuration determination section 1601 determines the modulation system of the digital transmission signal based on the communication situation. For example, frame configuration determination section 1601 selects one of (701), (702) (703) or (704) in FIG. 7 above or (1701) or (1702) in FIG. 17 as the optimal frame configuration.

Then, frame configuration determination section 1601 outputs the signals indicating the determined modulation system to quadrature baseband modulation section 102. Also, when the determined modulation system has a level of 8 or higher, frame configuration determination section 1601 determines the interval for inserting BPSK modulation symbols based on the communication situation and outputs a signal indicating the determined interval for inserting the BPSK modulation symbols to BPSK symbol modulation section 602 and frame configuration section 104. Furthermore, when the level of the determined modulation system is less than 8, frame configuration determination section 1601 outputs a signal giving an instruction to stop generating for BPSK modulation symbols to BPSK symbol modulation section 602.

BPSK symbol modulation section 602 performs BPSK-modulation on a digital transmission signal at the timing indicated from frame configuration determination section 1601 and outputs the in-phase component and the quadrature component of the BPSK modulation symbol to frame configuration section 104. However, when instructed to stop generating BPSK modulation symbols from frame configuration determination section 1601, BPSK symbol modulation section 602 stops operation.

Transmission path distortion estimation section 2001 receives the in-phase component and the quadrature component of the quadrature baseband signal as inputs, estimates the amount of transmission path distortion from the reception condition of the BPSK modulation symbol shown in FIG. 8 and FIG. 9 above, the BPSK modulation symbol shown in FIG. 18 or the QPSK modulation symbol shown in FIG. 19 and outputs the amount of transmission path distortion to detection section 2002.

Furthermore, in this embodiment, the transmission apparatus in FIG. 16. can also have a configuration having QPSK symbol modulation section 1102 shown in FIG. 11 instead of pilot symbol generation section 103.

In this case, frame configuration determination section 1601 determines the modulation system of the digital transmission signal based on the communication situation. For example, frame configuration determination section 1601 selects one of (1201), (1202), (1203) or (1204) in FIG. 12 above or (1701) or (1702) in FIG. 17 as the optimal frame configuration.

Then, frame configuration determination section 1601 outputs a signal indicating the determined modulation system to quadrature baseband modulation section 102. Also, when the determined modulation system uses 8 or more-levels, frame configuration determination section 1601 determines the interval for inserting QPSK modulation symbols based on the communication situation and outputs a signal indicating the determined interval for inserting the QPSK symbols to QPSK symbol modulation section 1102 and frame configuration section 104. Also, when the level of the determined modulation system is less than 8, frame configuration determination section 1601 outputs a signal giving an instruction to stop generating QPSK modulation symbols to QPSK symbol modulation section 1102.

QPSK symbol modulation section 1102 performs QPSK-modulation on a digital transmission signal at the timing indicated from frame configuration determination section 1601 and outputs the in-phase component and the quadrature component of the QPSK modulation symbol to frame configuration section 104. However, when instructed to stop generating QPSK modulation symbols from frame configuration determination section 1601, QPSK symbol modulation section 1102 stops operation.

Transmission path distortion estimation section 2001 receives the in-phase component and the quadrature component of the quadrature baseband signal as inputs, estimates the amount of transmission path distortion from the reception condition of the QPSK modulation symbol shown in FIG. 13 or FIG. 14 and the BPSK modulation symbol shown in FIG. 18 or the QPSK modulation symbol shown in FIG. 19 and outputs the amount of transmission path distortion to detection section 2002.

Here, this embodiment explains two intervals for inserting known pilot symbols, but the present invention is not limited to these. Also, this embodiment explains two modulation systems that have a level of 8 or higher for information symbol, namely 16QAM and the 8PSK modulation, but the present invention is not limited to these.

Furthermore, this embodiment describes the frame configurations in FIG. 2, FIG. 7, FIG. 12 and FIG. 17 but the present invention is not limited to these frame configurations.

Furthermore, the BPSK modulation method and the QPSK modulation method of the modulation system of information symbols of the present invention are not limited to the signal point layouts shown in FIG. 18 and FIG. 19 but π/2 shift BPSK modulation or π/4 shift QPSK modulation can also be used.

Embodiment 5

Embodiment 5 describes a digital radio communication method by which the interval of inserting a known pilot symbol, the number of signal points with one symbol immediately before and immediately after a known pilot symbol (hereinafter referred to as "symbols before and after the pilot symbol") and signal point layout and the modulation system of information symbol other than those symbols are changed.

Figure 21:
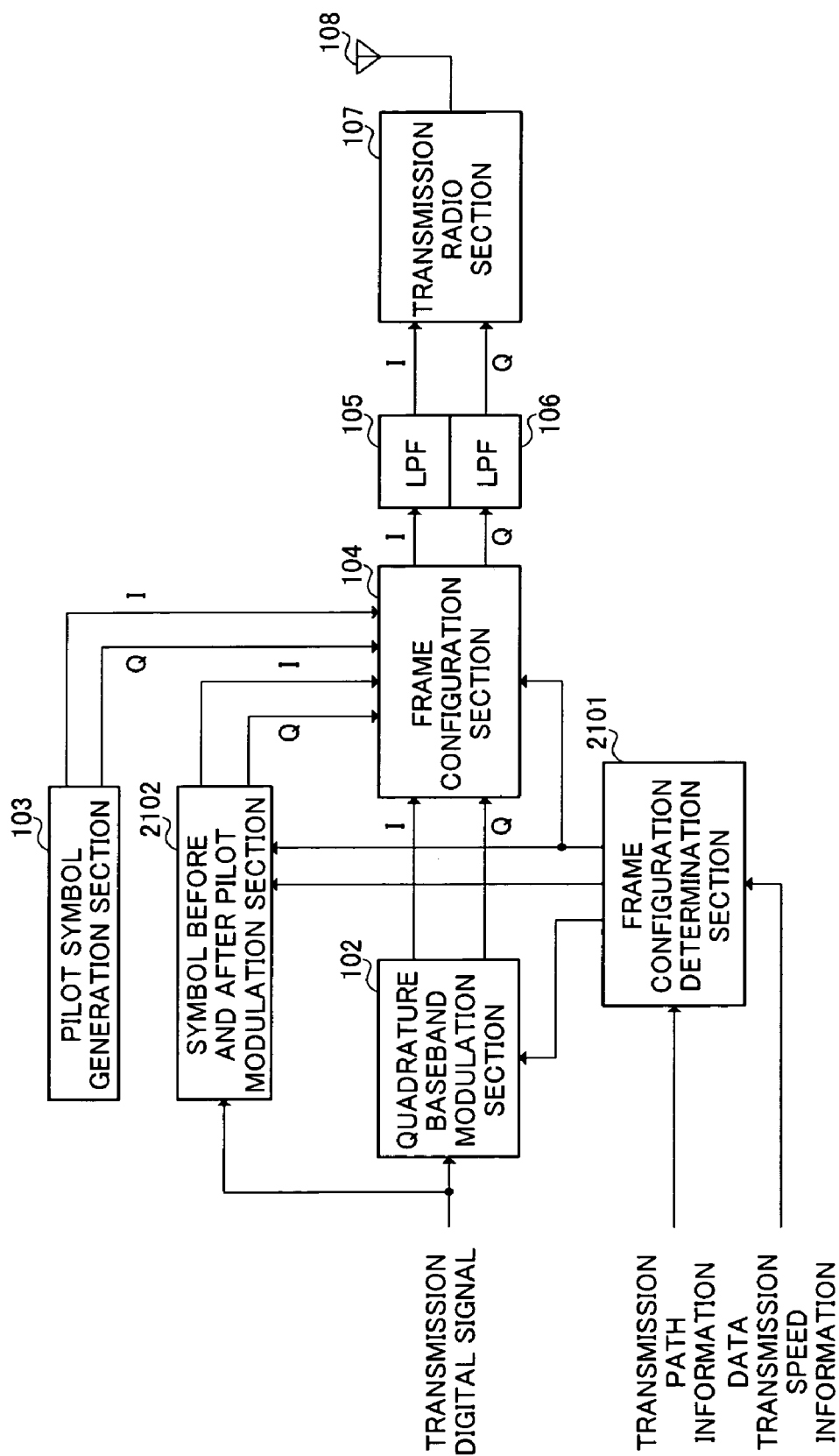
FIG. 21 is a block diagram showing a configuration of a transmission apparatus according to Embodiment 5 of the present invention.

FIG. 21 is a block diagram showing a configuration of the transmission apparatus according to this embodiment. In the transmission apparatus shown in FIG. 21, the components common to those in the transmission apparatus shown in FIG. 1 are assigned the same reference numerals as those shown in FIG. 1 and their explanations will be omitted.

In the transmission apparatus in FIG. 21, frame configuration determination section 2101 differs in the way of operation from frame configuration determination section 101 in FIG. 1. Furthermore, the transmission apparatus in FIG. 21 adopts a configuration with symbols-before-and-after-pilot modulation section 2102 added compared to FIG. 1.

Frame configuration determination section 2101 determines the interval for inserting known pilot symbols and the modulation system of digital transmission signals based on the communication situation. In this case, frame configuration determination section 2101 applies different modulation systems to the symbols before and after the pilot symbol, and to other information symbols.

Then, frame configuration determination section 2101 outputs a signal indicating the modulation system of the symbols before and after the pilot symbol to symbols-before-and-after-pilot modulation section 2102, outputs a signal indicating the modulation system of other information symbols to quadrature baseband modulation section 102 and outputs a signal indicating the determined interval for inserting known pilot symbols to symbols-before-and-after-pilot modulation section 2102 and frame configuration section 104.

Symbols-before-and-after-pilot modulation section 2102 modulates a digital transmission signal by a predetermined modulation system at the timing indicated from frame configuration determination section 2101 and outputs the in-phase component and the quadrature component of the symbols before and after the pilot symbol to frame configuration section 104.

Figure 22:
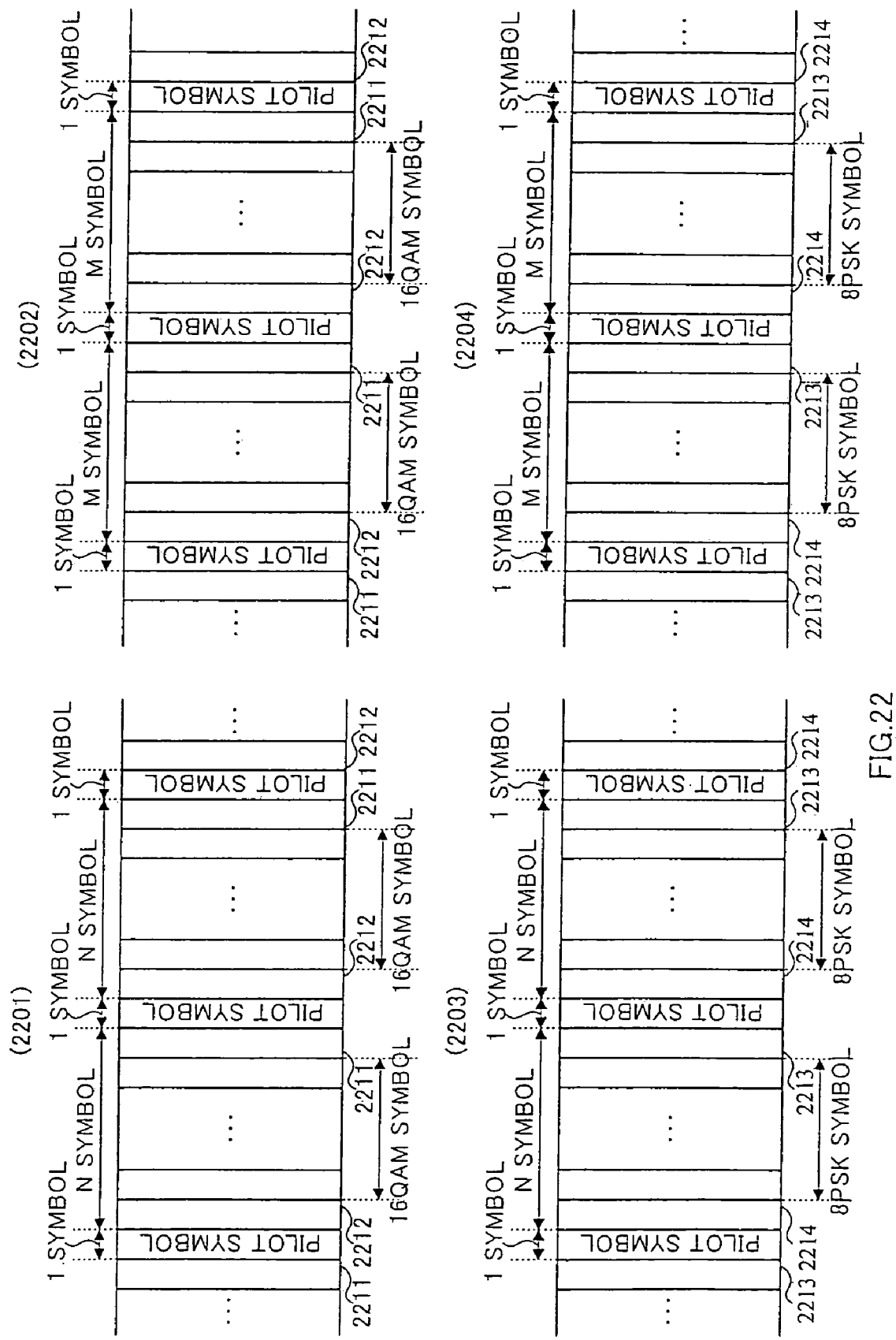
FIG. 22 illustrates examples of a frame configuration of a signal transmitted from the transmission apparatus of the Embodiment 5 of the present invention.

FIG. 22 illustrates examples of a frame configuration of a signal transmitted from the transmission apparatus of this embodiment and shows a time-symbol relationship. (2201) is a frame configuration where the modulation system of information symbol is 16QAM and the interval between known pilot symbols is N symbols. (2202) is a frame configuration where the modulation system of information symbol is 16QAM and the interval between known pilot symbols is M symbols. (2203) is a frame configuration where the modulation system of information symbol is 8PSK modulation and the interval between known pilot symbols is N symbols. (2204) is a frame configuration where the modulation system of information symbols is 8PSK modulation and the interval between known pilot symbols is M symbols. Suppose N<M at this time.

Signal point 2211 is 1 symbol immediately before the known pilot symbol when the information symbol modulation system is 16QAM, and signal point 2212 is 1 symbol immediately after the known pilot symbol when the information symbol modulation system is 16QAM. Signal point 2213 is 1 symbol immediately before the known pilot symbol when the information symbol modulation system is 8PSK modulation, and signal point 2214 is 1 symbol immediately after the known pilot symbol when the information symbol modulation system is 8PSK modulation.

Frame configuration determination section 2101 selects one of (2201), (2202), (2203) or (2204) in FIG. 22 as the optimal frame configuration based on the transmission path information and the request data transmission speed information.

For example, in the case of high-speed fading, frame configuration determination section 2101 sacrifices data transmission efficiency on the receiving side and selects the frame configuration of either (2201) or (2203) in FIG. 22 so as to insert known pilot symbols at shorter intervals to prevent deterioration of the data demodulation error rate and maintain the quality of data. On the other hand, in the case of low-speed fading, frame configuration determination section 2101 selects the frame configuration of either (2202) or (2204) in FIG. 22 so as to insert known pilot symbols at longer intervals to improve the data transmission efficiency.

Furthermore, when the level of the reception signal is large, frame configuration determination section 2101 gives priority to data transmission efficiency on the receiving side and selects the frame configuration of either (2201) or (2202) in FIG. 22 that adopts 16QAM as the modulation system of information symbol. On the other hand, when the level of the reception signal is small, frame configuration determination section 2101 gives priority to increasing error resiliency features while sacrificing data transmission efficiency on the receiving side and selects the frame configuration of either (2203) or (2204) in FIG. 22 that adopts 8PSK as the modulation system of information symbol.

Figure 23:
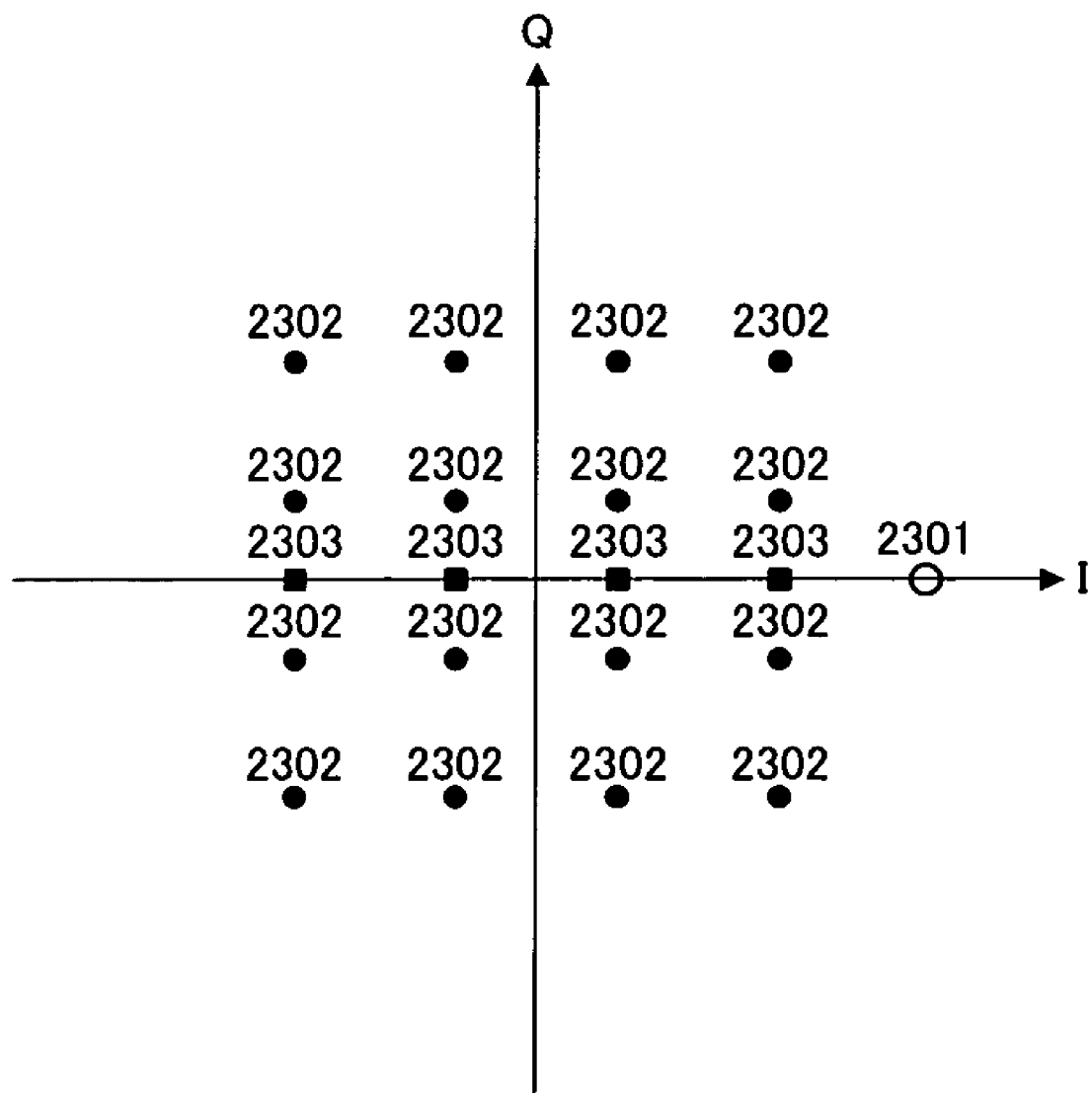
FIG. 23 is a layout of signal points of 16QAM, known pilot symbol and symbols before and after the pilot symbol on an in-phase I-quadrature Q plane.

FIG. 23 shows a signal point layout according to the 16QAM modulation method on the in-phase I-quadrature Q plane and a signal point layout according to a known pilot symbol and a signal point layout of symbols before and after the pilot symbol. Signal point 2301 is the signal point of known pilot symbol, signal points 2302 are the signal points of 16QAM modulation symbol and signal points 2303 are the signal points of symbols before and after the pilot symbol.

Figure 24:
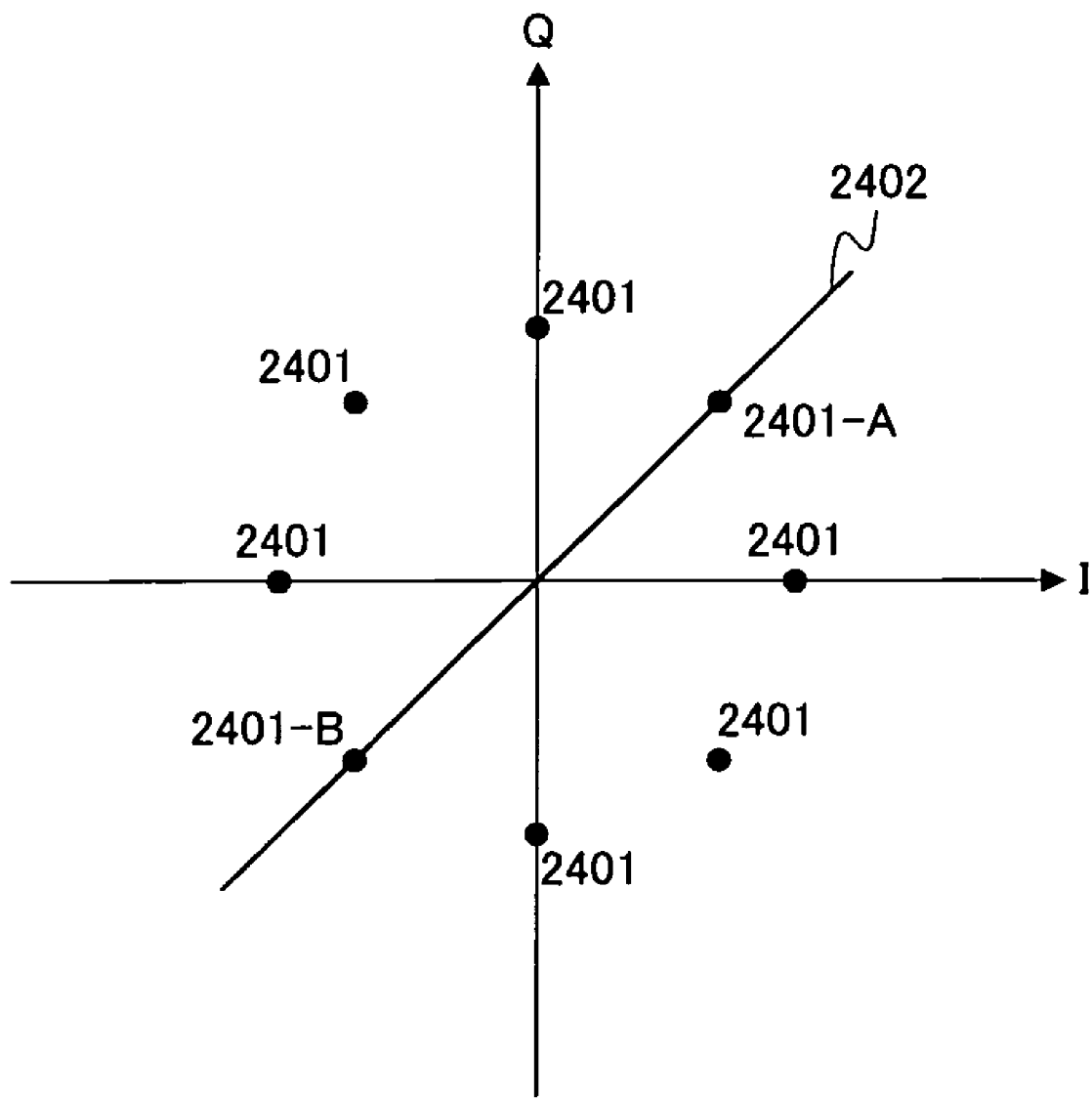
FIG. 24 is a layout of signal points of 8PSK modulation, known pilot symbol and symbols before and after the pilot symbol on an in-phase I-quadrature Q plane.

FIG. 24 shows a signal point layout according to the 8PSK modulation system on the in-phase I-quadrature Q plane, a signal point layout of known pilot symbol and a signal point layout of symbols before and after the pilot symbol. Signal points 2401, 2401-A and 2401-B are the signal points of 8PSK modulation symbol, 2401-A is the signal point of the known pilot symbol, 2401-A and 2401-B are the signal points of symbols before and after the pilot symbol and straight line 2402 is the straight line formed by linking the signal point of the known pilot symbol and the origin on the in-phase I-quadrature Q plane.

Figure 25:
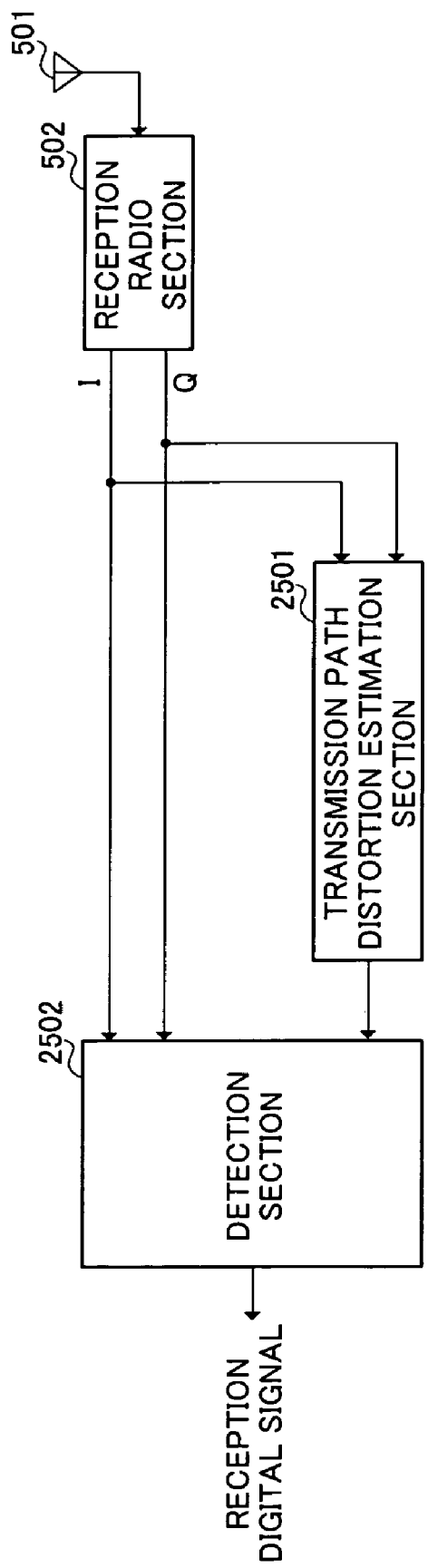
FIG. 25 is a block diagram showing a configuration of a reception apparatus according to Embodiment 5 of the present invention.

FIG. 25 is a block diagram showing a configuration of the reception apparatus according to this embodiment. In the reception apparatus shown in FIG. 25, the components common to those in the reception apparatus shown in FIG. 5 are assigned the same reference numerals as those shown in FIG. 5 and their explanations will be omitted.

In the reception apparatus in FIG. 25, transmission path estimation section 2501 differs in the way of operation from transmission path estimation section 503 and detection section 2502 differs in the way of operation from detection section 504 in FIG. 5.

Transmission path distortion estimation section 2501 receives the in-phase component and the quadrature component of the quadrature baseband signal as inputs, extracts the signal of the known pilot symbol shown in FIG. 23 and FIG. 24 above, estimates the amount of transmission path distortion from the reception condition of the known pilot symbol and outputs the amount of transmission path distortion to detection section 2502.

Detection section 2502 receives the in-phase component and the quadrature component of the quadrature baseband signal as inputs, detects information symbol including symbols before and after the pilot symbol based on the amount of transmission path distortion and outputs a digital reception signal.

Thus, changing the interval for inserting known pilot symbols and the modulation system of information symbol according to the communication situation such as fluctuations in the transmission path and the level of the reception signal can improve both the data transmission efficiency and the quality of data at the same time.

Furthermore, as shown in FIG. 23 and FIG. 24, by arranging two or more signal points before and after the pilot symbol on the straight line formed by linking the origin and the signal point of the known pilot symbol on the in-phase I-quadrature Q plane, it is possible for the reception apparatus in FIG. 25 to suppress deterioration of the estimation accuracy of reference phase and the amount of frequency offset by the pilot symbol, even if symbol synchronization is not established completely when a reference phase and the amount of frequency offset is estimated from the pilot signal. When detection section 116 performs detection, this allows the bit error rate characteristic based on the carrier-to-noise ratio to be improved.

Here, this embodiment can be combined with Embodiment 4 above. That is, when the determined modulation system uses has a level of 8 or higher, frame configuration determination section 2101 in FIG. 21 determines the interval for inserting pilot symbols based on the communication situation and outputs a signal indicating the determined interval for inserting pilot symbols to symbols-before-and-after-pilot modulation section 2102 and frame configuration section 104. Furthermore, when the level of the determined modulation system is less than 8, frame configuration determination section 2101 outputs a signal giving an instruction to stop generating pilot symbols to symbols-before-and-after-pilot modulation section 2102 and pilot symbol generation section 103.

Pilot symbol generation section 103 generates known pilot symbol between the transmitting side and the receiving side and outputs the in-phase component and the quadrature component of the known pilot symbol to frame configuration section 104. However, when instructed to stop generating pilot symbols from frame configuration determination section 2101, pilot symbol generation section 103 stops operation.

Symbols-before-and-after-pilot modulation section 2102 performs BPSK-modulation or QPSK-modulation on a digital transmission signal at the timing indicated from frame configuration determination section 2101 and outputs the in-phase component and the quadrature component of the symbols before and after the pilot symbol to frame configuration section 104. However, when instructed to stop generating pilot symbols from frame configuration determination section 2101, symbols-before-and-after-pilot modulation section 2102 stops operation.

This allows the effect of Embodiment 4 to be attained in addition to the effect of this embodiment as described above. Here, this embodiment describes two kinds of modulation systems of information symbol, namely 16QAM and 8PSK modulation, but the present invention is not limited to these.

Furthermore □ this embodiment explains only the configuration of information symbol, known pilot symbol, and symbols before and after the pilot symbol in FIG. 22, but the frame configuration of the present invention is not limited to the frame configuration composed of only information symbol, known pilot symbol, and symbols before and after the pilot symbol.

As described above, according to the present invention, by changing the interval for inserting known pilot symbol, BPSK modulation symbol or QPSK modulation symbol and by changing the modulation system of information symbol according to the communication situation of fluctuations in the transmission path and the level of the reception signal, it is possible to improve both the data transmission efficiency and the quality of data at the same time.

The present invention is not limited to the above described embodiments, and various variations and modifications may be possible without departing from the scope of the present invention.

This application is based on Japanese Patent Application No. HEI11-213289 filed on Jul. 28, 1999, entire content of which is expressly incorporated by reference herein.

What is claimed is:

1. A transmission apparatus comprising:
 a frame configuration determiner that determines a modulation system based on a communication situation;
 a first symbol generator that modulates a digital transmission signal according to the modulation system determined by the frame configuration determiner to generate a first symbol, the first symbol comprising a quadrature baseband signal;
 a second symbol generator that generates a second symbol, the second symbol comprising a pilot symbol; and
 a third symbol generator that generates a third symbol to be inserted immediately before and immediately after the second symbol, the third symbol being different from the first symbol,
 wherein, on a signal space diagram the third symbol generator arranges a signal point of the third symbol on a virtual line that links an origin and a signal point of the second symbol.

2. The transmission apparatus according to claim 1, wherein the pilot symbol comprises a reference symbol.

3. The transmission apparatus according to claim 1, wherein the frame configuration determiner determines an interval to insert the second symbol based on the communication situation.

4. The transmission apparatus according to claim 1, wherein the frame configuration determiner initially determines the communication situation based on at least one of transmission path information and data transmission speed information.

5. The transmission apparatus according to claim 1, wherein the frame configuration determiner initially determines the communication situation based on at least a quality of a received signal.

6. The transmission apparatus according to claim 1, wherein the second symbol is used for estimating a frequency of the signal of the first symbol.

7. The transmission apparatus according to claim 1, wherein an amplitude of a signal of the first symbol is smaller than an amplitude of a signal of the second symbol.

8. A digital radio communication method comprising:
   determining a modulation system based on a communication situation;
   modulating a digital transmission signal according to the determined modulation system to generate a first symbol comprising a quadrature baseband signal;
   generating a second symbol, the second symbol comprising a pilot symbol;
   generating a third symbol to be inserted immediately before and after the second symbol, the third symbol being different from the first symbol; and
   arranging, on a signal space diagram, a signal point of the third symbol on a virtual line that links an origin and a signal point of the second symbol.

9. The digital radio communication method according to claim 8, further comprising determining an interval by which to insert the second symbol based on the communication situation.

10. The digital radio communication method according to claim 8, further comprising determining the communication situation based on at least one of transmission path information and data transmission speed information.

11. The digital radio communication method according to claim 8, further comprising determining the communication situation based on at least a quality of a received signal.

12. A transmission apparatus comprising:
   a first symbol generator that modulates a digital transmission signal according to a first predetermined modulation system to generate a first symbol, the first symbol comprising a quadrature baseband signal;
   a second symbol generator that generates a second symbol, the second symbol comprising a known pilot symbol;
   a third symbol generator that modulates the digital transmission signal according to at least a second predetermined modulation system to generate a third symbol to be inserted immediately before and immediately after the second symbol;
   a frame configuration determiner that determines an interval of inserting the second symbol based on a communication situation; and
   a frame configurer that configures a frame by inserting the second symbol after the first symbol at the insertion interval determined by the frame configuration determiner.

13. A transmission apparatus comprising:
   a frame configuration determiner configured to determine a modulation system based on a communication situation;
   a first symbol generator configured to modulate a digital transmission signal according to the modulation system determined by the frame configuration determiner to generate a first symbol, the first symbol comprising a quadrature baseband signal;
   a second symbol generator configured to generate a second symbol, the second symbol being used for estimating a frequency of the signal of the first symbol; and
   a third symbol generator configured to generate a third symbol to be inserted immediately before and immediately after the second symbol;
   wherein, a signal point of the first symbol is different from a signal point of the second symbol, the signal point of the second symbol is different from a signal point of the third symbol, and the signal point of the third symbol is different from the signal point of the first symbol, and
   wherein, on a signal space diagram, the third symbol generator arranges the signal point of the third symbol on a virtual line that links an original and the signal point of the second symbol.

14. The transmission apparatus according to claim 13, wherein an amplitude of a signal of the first symbol is smaller than an amplitude of the signal of the second symbol.

* * * * *

UNITED STATES PATENT AND TRADEMARK OFFICE
CERTIFICATE OF CORRECTION

PATENT NO. : 6,993,092 B1
APPLICATION NO. : 09/627070
DATED : January 31, 2006
INVENTOR(S) : Yutaka Murakami et al.

It is certified that error appears in the above-identified patent and that said Letters Patent is hereby corrected as shown below:

Title Page;
On the cover of the printed patent, Item (56) FOREIGN PATENT DOCUMENTS, "01-065645" should read --10-065645--.

Signed and Sealed this

Twenty-fourth Day of June, 2008

JON W. DUDAS
*Director of the United States Patent and Trademark Office*